United States Patent
Lawson et al.

(10) Patent No.: US 10,139,811 B2
(45) Date of Patent: *Nov. 27, 2018

(54) SMART DEVICE FOR INDUSTRIAL AUTOMATION

(71) Applicant: ROCKWELL AUTOMATION TECHNOLOGIES, INC., Mayfield Heights, OH (US)

(72) Inventors: Douglas C. Lawson, Silverado, CA (US); Douglas J. Reichard, Fairview Park, OH (US); Joseph A. Harkulich, Willoughby, OH (US); Rainer Hessmer, Rancho Santa Margarita, CA (US); Sujeet Chand, Brookfield, WI (US); David W. Farchmin, Grafton, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 238 days.

This patent is subject to a terminal disclaimer.

(21) Appl. No.: 15/143,733

(22) Filed: May 2, 2016

(65) Prior Publication Data

US 2016/0246292 A1    Aug. 25, 2016

Related U.S. Application Data

(63) Continuation of application No. 13/725,660, filed on Dec. 21, 2012, now Pat. No. 9,363,336.

(Continued)

(51) Int. Cl.
   *G05B 19/00*    (2006.01)
   *G05B 19/418*   (2006.01)
   (Continued)

(52) U.S. Cl.
   CPC .......... *G05B 19/4185* (2013.01); *G05B 11/01* (2013.01); *G06F 1/12* (2013.01);
   (Continued)

(58) Field of Classification Search
   CPC ................ G05B 11/01; G05B 19/4185; G05B 2219/31326; G05B 2219/31334;
   (Continued)

(56) References Cited

U.S. PATENT DOCUMENTS 5,014,317 A    5/1991  Kita et al.
5,122,948 A    6/1992  Zapolin
(Continued)

FOREIGN PATENT DOCUMENTS

CN    101114160        1/2008
CN    101326471 A     12/2008
(Continued)

OTHER PUBLICATIONS

Final Office Action for U.S. Appl. No. 14/658,365 dated Sep. 8, 2017, 59 pages.

(Continued)

*Primary Examiner* — Christopher E. Everett
(74) *Attorney, Agent, or Firm* — Amin, Turocy & Watson, LLP

(57) ABSTRACT

A cloud-aware smart device that facilitates automated configuration and integration of the device within an automation system is provided. Upon installation within the automation system, the smart device determines its geographical location, identifies other devices on the system, and determines its role within the system. The smart device then establishes communication with a cloud platform running one or more cloud-based applications or services and sends a device profile containing the gathered information to the cloud platform. The device profile can be used to automatically (Continued)

configure the device for operation within the system or to add the smart device to an existing cloud-based application.

20 Claims, 16 Drawing Sheets

Related U.S. Application Data

(60) Provisional application No. 61/587,531, filed on Feb. 9, 2012.

(51) Int. Cl.

| | |
|---|---|
| *G05B 11/01* | (2006.01) |
| *G06F 17/30* | (2006.01) |
| *H04L 29/06* | (2006.01) |
| *H04L 29/08* | (2006.01) |
| *G06F 1/12* | (2006.01) |
| *G06F 1/14* | (2006.01) |
| *G06F 9/50* | (2006.01) |
| *G06N 7/00* | (2006.01) |
| *H04L 12/24* | (2006.01) |
| *G06F 8/60* | (2018.01) |
| *G06F 8/65* | (2018.01) |

(52) U.S. Cl.
CPC .............. *G06F 1/14* (2013.01); *G06F 8/60* (2013.01); *G06F 9/5072* (2013.01); *G06F 17/30233* (2013.01); *G06F 17/30545* (2013.01); *G06F 17/30554* (2013.01); *G06F 17/30867* (2013.01); *G06F 17/30991* (2013.01); *G06N 7/005* (2013.01); *H04L 41/12* (2013.01); *H04L 67/02* (2013.01); *H04L 67/10* (2013.01); *H04L 67/12* (2013.01); *H04L 67/16* (2013.01); *H04L 67/18* (2013.01); *H04L 67/42* (2013.01); *G05B 2219/31326* (2013.01); *G05B 2219/31334* (2013.01); *G05B 2219/33139* (2013.01); *G06F 8/65* (2013.01); *Y02P 80/114* (2015.11); *Y02P 90/10* (2015.11); *Y02P 90/14* (2015.11); *Y02P 90/16* (2015.11); *Y02P 90/18* (2015.11); *Y02P 90/185* (2015.11); *Y02P 90/20* (2015.11)

(58) Field of Classification Search
CPC .... G06F 17/30233; G06F 9/5072; G06F 1/14; G06F 17/30545; G06F 1/12
See application file for complete search history.

(56) References Cited

U.S. PATENT DOCUMENTS

| | | | |
|---|---|---|---|
| 5,199,009 A | 3/1993 | Svast | |
| 5,611,059 A | 3/1997 | Benton et al. | |
| 5,612,869 A | 3/1997 | Letzt et al. | |
| 5,682,460 A | 10/1997 | Hyziak et al. | |
| 5,710,885 A | 1/1998 | Bondi | |
| 5,844,794 A | 12/1998 | Keeley | |
| 5,845,149 A | 12/1998 | Husted et al. | |
| 5,856,931 A | 1/1999 | McCasland | |
| 5,978,568 A | 11/1999 | Abraham et al. | |
| 6,167,337 A | 12/2000 | Haack et al. | |
| 6,175,770 B1 | 1/2001 | Bladow | |
| 6,175,801 B1 | 1/2001 | Millington | |
| 6,199,068 B1 | 3/2001 | Carpenter | |
| 6,279,113 B1 | 8/2001 | Vaidya | |
| 6,282,455 B1 | 8/2001 | Engdahl | |
| 6,324,607 B1 | 11/2001 | Korowitz et al. | |
| 6,381,502 B1 | 4/2002 | Rudder et al. | |
| 6,400,996 B1 | 6/2002 | Hoffberg et al. | |
| 6,412,032 B1 | 6/2002 | Neet et al. | |
| 6,437,692 B1 | 8/2002 | Petite et al. | |
| 6,457,024 B1 | 9/2002 | Felsentein et al. | |
| 6,463,338 B1 | 10/2002 | Neet | |
| 6,535,926 B1 | 3/2003 | Esker | |
| 6,578,005 B1 | 6/2003 | Lesaint et al. | |
| 6,624,388 B1 | 9/2003 | Blankenship et al. | |
| 6,640,145 B2 | 10/2003 | Hoffberg et al. | |
| 6,651,062 B2 | 11/2003 | Ghannam et al. | |
| 6,675,226 B1 | 1/2004 | Nair et al. | |
| 6,686,838 B1 | 2/2004 | Rezvani et al. | |
| 6,691,159 B1 | 2/2004 | Grewal et al. | |
| 6,705,229 B2 | 3/2004 | Frankenberger | |
| 6,708,074 B1 | 3/2004 | Chi et al. | |
| 6,708,385 B1 | 3/2004 | Lemelson | |
| 6,714,974 B1 | 3/2004 | Machida | |
| 6,728,262 B1 | 4/2004 | Woram | |
| 6,732,165 B1 | 5/2004 | Jennings, III | |
| 6,732,191 B1 | 5/2004 | Baker et al. | |
| 6,774,598 B1 | 8/2004 | Kohler et al. | |
| 6,801,920 B1 | 10/2004 | Wischinski | |
| 6,819,960 B1 | 11/2004 | McKelvey et al. | |
| 6,891,850 B1 | 5/2005 | Vandesteeg et al. | |
| 6,895,532 B2 | 5/2005 | Raynham | |
| 6,904,600 B1 | 6/2005 | James et al. | |
| 6,907,302 B2 | 6/2005 | Karbassi | |
| 6,920,502 B2 | 7/2005 | Araujo et al. | |
| 6,952,680 B1 | 10/2005 | Melby et al. | |
| 6,965,802 B2 | 11/2005 | Sexton | |
| 6,968,242 B1 | 11/2005 | Hwu et al. | |
| 6,970,913 B1 | 11/2005 | Albert et al. | |
| 6,982,953 B1 | 1/2006 | Swales | |
| 7,032,045 B2 | 4/2006 | Kostadinov | |
| 7,085,814 B1 | 8/2006 | Gandhi et al. | |
| 7,103,428 B2 | 9/2006 | Varone et al. | |
| 7,133,900 B1 | 11/2006 | Szeto | |
| 7,149,792 B1 | 12/2006 | Hansen et al. | |
| 7,151,966 B1 | 12/2006 | Baier et al. | |
| 7,203,560 B1 | 4/2007 | Wylie et al. | |
| 7,210,095 B1 | 4/2007 | Mor | |
| 7,233,830 B1 | 6/2007 | Callaghan et al. | |
| 7,242,009 B1 | 7/2007 | Wilson et al. | |
| 7,275,037 B2 | 9/2007 | Lauer | |
| 7,277,865 B1 | 10/2007 | Silverstone et al. | |
| 7,289,994 B2 | 10/2007 | Nixon et al. | |
| 7,298,275 B2 | 11/2007 | Brandt et al. | |
| 7,310,344 B1 | 12/2007 | Sue | |
| 7,383,155 B2 | 6/2008 | Rosam et al. | |
| 7,412,548 B2 | 8/2008 | Sichner | |
| 7,478,010 B2 | 1/2009 | Hashemian | |
| 7,480,728 B2 | 1/2009 | Evans | |
| 7,539,724 B1 | 5/2009 | Callaghan | |
| 7,734,590 B2 | 6/2010 | Chand et al. | |
| 8,150,959 B1 | 4/2012 | Bezdicek et al. | |
| 8,266,066 B1 | 9/2012 | Wezter et al. | |
| 8,353,012 B2 | 1/2013 | Del Real | |
| 8,392,845 B2 | 3/2013 | Cahill et al. | |
| 8,451,753 B2 | 5/2013 | Vanga et al. | |
| 8,468,272 B2 | 6/2013 | Giroti | |
| 8,686,871 B2 | 4/2014 | Jensen et al. | |
| 8,924,328 B1 | 12/2014 | Kozlovsky et al. | |
| 9,024,955 B2 | 5/2015 | Ramarao et al. | |
| 9,117,076 B2 | 8/2015 | Devost | |
| 9,438,648 B2 | 9/2016 | Asenjo et al. | |
| 9,507,807 B1 | 11/2016 | Florissi et al. | |
| 9,690,669 B2 | 6/2017 | Bernal et al. | |
| 2002/0004798 A1 | 1/2002 | Babula et al. | |
| 2002/0016839 A1 | 2/2002 | Smith | |
| 2002/0042756 A1 | 4/2002 | Kumar et al. | |
| 2002/0046239 A1 | 4/2002 | Stawikowski et al. | |
| 2002/0049833 A1 | 4/2002 | Kikinis | |
| 2002/0065898 A1 | 5/2002 | Leontiev et al. | |
| 2002/0068983 A1 | 6/2002 | Sexton | |
| 2002/0068984 A1 | 6/2002 | Alexander et al. | |
| 2002/0073236 A1 | 6/2002 | Helgeson et al. | |
| 2002/0077711 A1 | 6/2002 | Nixon et al. | |
| 2002/0082966 A1 | 6/2002 | O'Brien et al. | |
| 2002/0094588 A1 | 7/2002 | Fan et al. | |
| 2002/0107904 A1 | 8/2002 | Talluri et al. | |
| 2002/0138378 A1 | 9/2002 | Leskuski | |
| 2002/0156872 A1 | 10/2002 | Brown | |

(56) References Cited

U.S. PATENT DOCUMENTS

| | | |
|---|---|---|
| 2002/0156926 A1 | 10/2002 | Batke et al. |
| 2002/0161745 A1 | 10/2002 | Call |
| 2002/0169993 A1 | 11/2002 | Woods et al. |
| 2003/0004937 A1 | 1/2003 | Salmenkaita et al. |
| 2003/0009253 A1 | 1/2003 | McIntyre et al. |
| 2003/0009572 A1 | 1/2003 | Thurner |
| 2003/0011467 A1 | 1/2003 | Suomela |
| 2003/0014149 A1 | 1/2003 | Kreidler et al. |
| 2003/0023336 A1 | 1/2003 | Kreidler et al. |
| 2003/0041089 A1 | 2/2003 | Mauro |
| 2003/0051074 A1 | 3/2003 | Edwards |
| 2003/0056224 A1 | 3/2003 | Stone |
| 2003/0105535 A1 | 6/2003 | Rammler |
| 2003/0105585 A1 | 6/2003 | Ukita |
| 2003/0109942 A1 | 6/2003 | Yeh et al. |
| 2003/0120817 A1 | 6/2003 | Ott et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0198188 A1 | 10/2003 | Castlebury et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0083165 A1 | 4/2004 | Lawrence |
| 2004/0111512 A1 | 6/2004 | Barth |
| 2004/0148039 A1 | 7/2004 | Farchmin et al. |
| 2004/0148187 A1 | 7/2004 | Boettcher et al. |
| 2004/0148383 A1 | 7/2004 | Gonsalves |
| 2004/0159113 A1 | 8/2004 | Singh et al. |
| 2004/0199573 A1 | 10/2004 | Schwartz et al. |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0038528 A1 | 2/2005 | McKelvey et al. |
| 2005/0055429 A1 | 3/2005 | Abele et al. |
| 2005/0080799 A1 | 4/2005 | Hamden et al. |
| 2005/0120112 A1 | 6/2005 | Wing et al. |
| 2005/0125441 A1 | 6/2005 | Clemens et al. |
| 2005/0149922 A1 | 7/2005 | Vincent |
| 2005/0203869 A1 | 9/2005 | Minamino et al. |
| 2005/0209902 A1 | 9/2005 | Iwasaki et al. |
| 2005/0257204 A1 | 11/2005 | Bryant et al. |
| 2006/0022048 A1 | 2/2006 | Johnson |
| 2006/0046712 A1 | 3/2006 | Shamp et al. |
| 2006/0077095 A1 | 4/2006 | Tucker et al. |
| 2006/0149813 A1 | 7/2006 | Janik |
| 2006/0153089 A1 | 7/2006 | Silverman |
| 2006/0173873 A1 | 8/2006 | Prompt et al. |
| 2006/0190106 A1 | 8/2006 | Kay et al. |
| 2006/0236374 A1 | 10/2006 | Hartman |
| 2006/0253205 A1 | 11/2006 | Gardiner |
| 2006/0259472 A1 | 11/2006 | MacClellan |
| 2006/0282432 A1 | 12/2006 | Cassidy et al. |
| 2007/0008129 A1 | 1/2007 | Soliman |
| 2007/0019641 A1 | 1/2007 | Pai et al. |
| 2007/0021968 A1 | 1/2007 | Amir et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0078525 A1 | 4/2007 | Chand |
| 2007/0078536 A1 | 4/2007 | Gordon et al. |
| 2007/0078862 A1 | 4/2007 | Chand et al. |
| 2007/0112801 A1 | 5/2007 | McGreevy et al. |
| 2007/0118560 A1 | 5/2007 | Bomhoevd et al. |
| 2007/0130112 A1 | 6/2007 | Lin |
| 2007/0192213 A1 | 8/2007 | Wu et al. |
| 2007/0194097 A1 | 8/2007 | Jones |
| 2007/0244892 A1 | 10/2007 | Narancic |
| 2007/0245169 A1 | 10/2007 | Farchmin et al. |
| 2007/0247789 A1 | 10/2007 | Benson et al. |
| 2007/0255431 A1 | 11/2007 | Kinsey |
| 2008/0027704 A1 | 1/2008 | Kephart et al. |
| 2008/0065243 A1 | 3/2008 | Fallman et al. |
| 2008/0077512 A1 | 3/2008 | Grewal |
| 2008/0082186 A1 | 4/2008 | Hood et al. |
| 2008/0125887 A1 | 5/2008 | Case |
| 2008/0155064 A1 | 6/2008 | Kosuge et al. |
| 2008/0189637 A1 | 8/2008 | Krajewski et al. |
| 2008/0208365 A1 | 8/2008 | Grgic et al. |
| 2008/0209211 A1 | 8/2008 | Grgic et al. |
| 2008/0263514 A1 | 10/2008 | DeMesa et al. |
| 2009/0037872 A1 | 2/2009 | Schnabele et al. |
| 2009/0063258 A1 | 3/2009 | Mueller et al. |
| 2009/0083204 A1 | 3/2009 | Baier et al. |
| 2009/0086692 A1 | 4/2009 | Chen |
| 2009/0088875 A1 | 4/2009 | Baler et al. |
| 2009/0089233 A1 | 4/2009 | Gach et al. |
| 2009/0089359 A1 | 4/2009 | Siorek et al. |
| 2009/0089682 A1 | 4/2009 | Baier et al. |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2010/0023562 A1 | 1/2010 | Kreuch et al. |
| 2010/0057660 A1 | 3/2010 | Kato |
| 2010/0076575 A1 | 3/2010 | Vasko et al. |
| 2010/0082127 A1 | 4/2010 | Plache et al. |
| 2010/0082129 A1 | 4/2010 | McGreevy et al. |
| 2010/0082453 A1 | 4/2010 | Speers et al. |
| 2010/0082669 A1 | 4/2010 | Obitko et al. |
| 2010/0083232 A1 | 4/2010 | Chouinard et al. |
| 2010/0118895 A1 | 5/2010 | Radulescu |
| 2010/0146014 A1 | 6/2010 | Ionescu et al. |
| 2010/0153487 A1 | 6/2010 | Greven et al. |
| 2010/0192144 A1 | 7/2010 | Schmit |
| 2010/0211509 A1 | 8/2010 | Jacobs |
| 2010/0241260 A1 | 9/2010 | Kilibarda et al. |
| 2010/0256795 A1 | 10/2010 | McLaughlin et al. |
| 2010/0257227 A1 | 10/2010 | McLaughlin et al. |
| 2010/0257228 A1 | 10/2010 | Staggs et al. |
| 2010/0318837 A1 | 12/2010 | Murphy et al. |
| 2010/0324855 A1 | 12/2010 | Parker |
| 2010/0332008 A1 | 12/2010 | Knipfer et al. |
| 2011/0016058 A1 | 1/2011 | Pinchuk |
| 2011/0047230 A1 | 2/2011 | McGee |
| 2011/0078300 A9 | 3/2011 | Grelewicz et al. |
| 2011/0161378 A1 | 6/2011 | Williamson |
| 2011/0173127 A1 | 7/2011 | Ho et al. |
| 2011/0276498 A1 | 11/2011 | Madhok |
| 2012/0005242 A1 | 1/2012 | Feng et al. |
| 2012/0054246 A1 | 3/2012 | Fischer |
| 2012/0072597 A1 | 3/2012 | Teather et al. |
| 2012/0079461 A1 | 3/2012 | Copass et al. |
| 2012/0083906 A1 | 4/2012 | Weatherhead et al. |
| 2012/0084400 A1 | 4/2012 | Almadi et al. |
| 2012/0089920 A1 | 4/2012 | Eick |
| 2012/0101801 A1 | 4/2012 | Van Dorsselaer |
| 2012/0147894 A1 | 6/2012 | Mulligan et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1 | 11/2012 | Holt et al. |
| 2012/0297249 A1 | 11/2012 | Yang et al. |
| 2012/0304007 A1 | 11/2012 | Hanks et al. |
| 2012/0306620 A1 | 12/2012 | Karaffa et al. |
| 2013/0004281 A1 | 1/2013 | Anders et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1 | 2/2013 | Galm et al. |
| 2013/0041705 A1 | 2/2013 | Hampapur et al. |
| 2013/0097563 A1 | 4/2013 | Pacheco Rodrigues Velho et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111034 A1 | 5/2013 | Upadhya |

(56) References Cited

U.S. PATENT DOCUMENTS

| | | |
|---|---|---|
| 2013/0117064 A1 | 5/2013 | Sadeghi et al. |
| 2013/0117806 A1 | 5/2013 | Parthasarathy et al. |
| 2013/0125233 A1 | 5/2013 | Bush et al. |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211546 A1 | 8/2013 | Lawson et al. |
| 2013/0211547 A1 | 8/2013 | Buchdunger et al. |
| 2013/0212420 A1 | 8/2013 | Lawson et al. |
| 2013/0218971 A1 | 8/2013 | Sasaki et al. |
| 2013/0257627 A1 | 10/2013 | Rafael |
| 2013/0262654 A1 | 10/2013 | Masli et al. |
| 2013/0283265 A1 | 10/2013 | Acharya et al. |
| 2013/0304237 A1 | 11/2013 | Schroeder et al. |
| 2013/0325545 A1 | 12/2013 | Mordvinova et al. |
| 2014/0013100 A1 | 1/2014 | Menzel et al. |
| 2014/0046977 A1 | 2/2014 | Gopalakrishnan et al. |
| 2014/0047107 A1 | 2/2014 | Maturana et al. |
| 2014/0052499 A1 | 2/2014 | Wagner et al. |
| 2014/0059056 A1 | 2/2014 | Chaney et al. |
| 2014/0095654 A1 | 4/2014 | Finnerty et al. |
| 2014/0137257 A1 | 5/2014 | Martinez et al. |
| 2014/0156032 A1 | 6/2014 | Jenkins et al. |
| 2014/0156584 A1 | 6/2014 | Motukuri et al. |
| 2014/0279641 A1 | 9/2014 | Singh et al. |
| 2014/0279948 A1 | 9/2014 | Mahate et al. |
| 2014/0306533 A1 | 10/2014 | Paquin et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336791 A1 | 11/2014 | Asenjo et al. |
| 2014/0336795 A1 | 11/2014 | Asenjo et al. |
| 2014/0337000 A1 | 11/2014 | Asenjo et al. |
| 2014/0358606 A1 | 12/2014 | Hull |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0032886 A1 | 1/2015 | Wang |
| 2015/0048952 A1 | 2/2015 | Murphy |
| 2015/0235161 A1 | 8/2015 | Azar et al. |
| 2015/0304193 A1 | 10/2015 | Ishii et al. |
| 2015/0378356 A1 | 12/2015 | Hefeeda et al. |
| 2016/0217410 A1 | 7/2016 | Santos et al. |

FOREIGN PATENT DOCUMENTS

| | | |
|---|---|---|
| CN | 101536002 | 9/2009 |
| CN | 101739007 | 6/2010 |
| CN | 102449567 | 5/2012 |
| CN | 102927937 | 2/2013 |
| CN | 103019102 | 4/2013 |
| CN | 104142629 A | 11/2014 |
| CN | 104142630 A | 11/2014 |
| CN | 104142662 A | 11/2014 |
| CN | 104142664 A | 11/2014 |
| CN | 104142679 A | 11/2014 |
| DE | 19834456 | 2/2000 |
| EP | 1209558 | 5/2002 |
| EP | 1531373 | 5/2005 |
| EP | 1686442 | 8/2006 |
| EP | 1933214 | 6/2008 |
| EP | 2189900 | 5/2010 |
| EP | 2293164 | 3/2011 |
| EP | 2453326 | 5/2012 |
| EP | 2469466 | 6/2012 |
| EP | 2801938 | 11/2014 |
| EP | 2801940 | 11/2014 |
| EP | 2801941 | 11/2014 |
| WO | 0111586 | 2/2001 |
| WO | 0169329 | 9/2001 |
| WO | 0217131 | 2/2002 |
| WO | 03058506 | 7/2003 |
| WO | 2008133715 | 11/2008 |
| WO | 2009046095 | 4/2009 |
| WO | 2011050482 | 5/2011 |
| WO | 2013007866 | 1/2013 |

OTHER PUBLICATIONS

Office Action for U.S. Appl. No. 14/087,821 dated Sep. 7, 2017, 63 pages.
Final Office Action for U.S. Appl. No. 14/087,730 dated Aug. 18, 2017, 72 pages.
Office Action for U.S. Appl. No. 15/214,583 dated Aug. 28, 2017, 80 pages.
Final Office Action for U.S. Appl. No. 14/658,345 dated Sep. 25, 2017, 52 pages.
Office Action for European Patent Application Serial No. 16160604.1-1802, dated May 17, 2017, 6 pages.
European Office Action for EP Patent Application Serial No. 16160604.1, dated Sep. 26, 2016, 2 pages.
Office Action for U.S. Appl. No. 13/615,195, dated Oct. 21, 2016, 44 pages.
Office Action for U.S. Appl. No. 14/088,011, dated Nov. 1, 2016, 79 pages.
European Office Action for EP Patent Application Serial No. 16160602.5, dated Oct. 10, 2016, 2 pages.
Office Action for U.S. Appl. No. 14/088,014, dated Nov. 17, 2016, 61 pages.
Chinese Office Action for CN Application Serial No. 201410196114.8, dated Nov. 9, 2016, 19 pages.
Chinese Office Action for CN Application Serial No. 201410196905.0, dated Nov. 18, 2016, 6 pages.
Office Action for U.S. Appl. No. 14/087,922, dated Nov. 25, 2016, 65 pages.
European Office Action for EP Patent Application Serial No. 16160610.8, dated Oct. 17, 2016, 2 pages.
Non-Final Office Action for U.S. Appl. No. 14/087,730, dated Feb. 9, 2017, 78 pages.
Chinese Office Action for CN Application Serial No. 201410198289.2, dated Dec. 15, 2016, 21 pages.
Chinese Office Action for CN Application Serial No. 201410195780.X, dated Feb. 3, 2017, 18 pages.
Chinese Office Action for CN Application Serial No. 201410196127.5, dated Nov. 30, 2016, 13 pages.
Office Action for U.S. Appl. No. 15/206,744 dated Nov. 6, 2017, 48 pages.
Final Office Action for U.S. Appl. No. 15/388,260 dated Oct. 18, 2017, 76 pages.
Office Action for U.S. Appl. No. 14/658,327 dated Oct. 30, 2017, 48 pages.
Final Office Action for U.S. Appl. No. 14/658,394 dated Nov. 16, 2017, 49 pages.
Extended European Search Report for European Patent Application Serial No. 16160604.1, dated Aug. 17, 2016, 9 pages.
Final Office Action for U.S. Appl. No. 14/087,977, dated Jul. 13, 2016, 59 pages.
Final Office Action for U.S. Appl. No. 14/088,014, dated Jul. 15, 2016, 65 pages.
Non-Final Office Action for U.S. Appl. No. 14/087,922, dated Jul. 19, 2016, 120 pages.
Extended European Search Report for EP Patent Application Serial No. 16160611.6, dated Aug. 24, 2016, 10 pages.
Final Office Action for U.S. Appl. No. 14/087,730, dated Aug. 24, 2016, 113 pages.
Extended European Search Report for EP Patent Application Serial No. 16160602.5, dated Sep. 2, 2016, 9 pages.
Non-Final Office Action for U.S. Appl. No. 14/087,835, dated Sep. 23, 2016, 82 pages.
Final Office Action for U.S. Appl. No. 14/087,821, dated Sep. 9, 2016, 97 pages.
Extended European Search Report for EP Patent Application Serial No. 13166670.3, dated Jun. 14, 2016, 10 pages.

(56) References Cited

OTHER PUBLICATIONS

"Cloud Computing," Whatis.com, Oct. 27, 2009, http://searchcloudcomputing.techtarget.com/sDefinition/0,,sid201_gci1287881,00.html, 2 pages.
Mell, P., et al., "The NIST Definition of Cloud Computing," Oct. 7, 2009, http://csrc.nist.gov/groups/SNS/cloud/computing/index.html, 2 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
Office Action for U.S. Appl. No. 15/490,076 dated Dec. 20, 2017, 37 pages.
Office Action for U.S. Appl. No. 15/278,139 dated Jan. 11, 2018, 103 pages.
Final Office Action for U.S. Appl. No. 14/087,821 dated Dec. 14, 2017, 37 pages.
Final Office Action for U.S. Appl. No. 14/088,011 dated Nov. 22, 2017, 77 pages.
Office Action for U.S. Appl. No. 14/087,970 dated Feb. 12, 2018, 69 pages.
Chinese Office Action for CN Application Serial No. 201410196114.8, dated Dec. 13, 2017, 26 pages.
Non-Final Office Action for U.S. Appl. No. 14/087,821 dated Mar. 2, 2016, 86 pages.
Non-Final Office Action for U.S. Appl. No. 14/087,977 dated Mar. 17, 2016, 83 pages.
Recursion Software, "SCADA-Aware Mobile", Frisco, TX, Aug. 29, 2012 (accessed from http://www.emsenergyautomation.com/brochures/scada.pdf on Feb. 11, 2016).
Ars Technica, "Windows 7 themes: how to unlock them or create your own", Nov. 12, 2009 (accessed from http://arstechnica.com/information-technology/2009/11/unlock-hidden-windows-7-themesl on Mar. 8, 2016).
Non-Final Office Action for U.S. Appl. No. 14/088,014 dated Mar. 22, 2016, 98 pages.
"Microsoft," "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth= 1).
Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Chinese Office Action for Chinese Application No. 201410196198.5 dated Mar. 29, 2016, 18 pages.
Non-Final Office Action for U.S. Appl. No. 14/088,011 dated May 12, 2016, 96 pages.
Chinese Office Action for Chinese Application No. 201410198289.2 dated Apr. 5, 2016, 18 pages.
Chinese Office Action for Chinese Application No. 201410196905.0 dated Apr. 5, 2016, 20 pages.
Chinese Office Action for Chinese Application No. 201410196127.5 dated Apr. 7, 2016, 13 pages.
Chinese Office Action for Chinese Application No. 201410196775.0 dated May 5, 2016, 14 pages.
Chinese Office Action for Chinese Application No. 201410196525.7 dated May 5, 2016, 13 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.
Office Action dated Jun. 17, 2016 for U.S. Appl. No. 14/087,970, 36 pages.
Chinese Office Action for Chinese Application No. 201410196114.8 dated Apr. 25, 2016, 20 pages.
Office Action dated Sep. 22, 2015 for European Application No. 14167707.0/1955, 9 pages.
Chinese Office Action dated May 26, 2016 for Chinese Application No. 201410195780.X, 16 pages.
European Search Report dated Aug. 11, 2014 for European Application No. 14167714.6-1955, 5 pages.
European Search Report dated Aug. 11, 2014 for European Application No. 14167706.2-1955, 7 pages.
European Search Report dated Aug. 11, 2014 for European Application No. 14167626.2-1955, 9 pages.
European Search Report dated Aug. 11, 2014 for European Application No. 14167627.0-1955, 6 pages.
European Search Report dated Aug. 11, 2014 for European Application No. 14167703.9-1955, 7 pages.
European Search Report dated Aug. 11, 2014 for European Application No. 14167707.0-1955, 7 pages.
European Search Report dated Aug. 11, 2014 for European Application No. 14167708.8-1955, 5 pages.
European Search Report dated Aug. 11, 2014 for European Application No. 14167712.0-1955, 5 pages.
European Search Report dated Aug. 11, 2014 for European Application No. 14167511.6-1955, 6 pages.
Office Action dated Dec. 27, 2004 for U.S. Appl. No. 10/162,315, 8 pages.
Office Action dated Jun. 15, 2005 for U.S. Appl. No. 10/162,315, 9 pages.
Office Action dated Sep. 9, 2005 for U.S. Appl. No. 10/162,315, 10 pages.
Vasudevan, A Web Services Primer, Apr. 4 2001, XML.com, http://webservices.xml.com/pub/a/ws/2001/04/04/webservices/index.html.
Office Action dated Mar. 6, 2006 for U.S. Appl. No. 10/162,315, 8 pages.
W3C, Web Services Description Language, http://www.w3.org/TR/wsd1, Mar. 15, 2001, 36 pages.
European Search Report dated Mar. 18, 2004 for European Patent Application Serial No. 03026339, 3 Pages.
Compuquest, Inc., SPM-IM-Instant Messaging Client for SpreadMsg Wireless Messaging Software, http://www.compuquestinc.com/spmim.html, Aug. 13, 2002, 4 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
International Business Machines Corporation, Cross platform instant messaging using web services, Research Disclosure, Kenneth Mason Publications, Hampshire, GB, vol. 458, No. 156, Jun. 2002.
Office Action dated Jun. 18, 2014 for U.S. Appl. No. 13/725,578, 13 pages.
Office Action dated Aug. 19, 2014 for U.S. Appl. No. 13/615,195, 22 pages.
Office Action dated Oct. 9, 2014 for U.S. Appl. No. 13/725,543, 10 pgs.
Office Action dated Dec. 12, 2014 for U.S. Appl. No. 13/725,578, 24 pages.
Office Action dated Jan. 20, 2015 for U.S. Appl. No. 13/615,195, 22 pages.
Third Party Submission under 37 CFR 1.290 dated Nov. 21, 2014 for U.S. Appl. No. 14/087,873, 23 pages.
Office Action for U.S. Appl. No. 13/725,543 dated May 20, 2015, 15 pages.
Office Action for U.S. Appl. No. 13/608,821 dated Jun. 1, 2015, 44 pages.
Office Action for U.S. Appl. No. 13/608,850 dated Jun. 1, 2015, 38 pages.
Office Action for U.S. Appl. No. 13/677,060 dated Apr. 24, 2015, 54 pgs.
Office Action for U.S. Appl. No. 13/725,619 dated Jul. 17, 2015, 45 pages.
Office Action for U.S. Appl. No. 13/725,660 dated Aug. 18, 2015, 90 pgs.
Colombo, A.W., et al., "Factory of the Future: A Service-Oriented System of Modular, Dynamic Reconfigurable and collaborative Systems," Artificial Intelligence Techniques for Networked Manu-

(56) References Cited

OTHER PUBLICATIONS facturing Enterprises Management, Springer Series in Advanced Manufacuring 2010, pp. 459-481.
Colombo, Amando Walter, et al., "Towards the Factory of the Future: A Service-Oriented Cross-layer Infrastructure," ICT Shaping the World: A Scientific View, 2009, pp. 65-81.
Notice of Allowance for U.S. Appl. No. 13/725,578, dated Apr. 24, 2015, 23 pages.
Office Action for U.S. Appl. No. 13/677,060, dated Oct. 20, 2015, 48 pages.
Office Action for U.S. Appl. No. 13/615,195, dated Sep. 21, 2015, 19 pages.
Office Action for U.S. Appl. No. 13/725,660, dated Oct. 26, 2015, 79 pages.
Office Action dated Nov. 25, 2015 for U.S. Appl. No. 14/087,873, 57 pages.
Final Office Action for U.S. Appl. No. 13/725,619 dated Dec. 4, 2015, 21 pages.
Final Office Action for U.S. Appl. No. 13/608,821 dated Dec. 7, 2015, 39 pages.
Final Office Action for U.S. Appl. No. 13/615,195, dated Feb. 11, 2016, 19 pages.
Non-Final Office Action for U.S. Appl. No. 13/725,543, dated Feb. 2, 2016, 15 pages.
Non-Final Office Action for U.S. Appl. No. 13/725,660, dated Jan. 21 2016, 72 pages.
Final Office Action for U.S. Appl. No. 13/608,850, dated Dec. 9, 2015, 25 pages.
Office Action dated Nov. 24, 2015 for European Application No. 14167706.2-1955, 8 pages.
Office Action dated Nov. 24, 2015 for European Application No. 14167626.2-1955, 8 pages.
Notice of Allowance for U.S. Appl. No. 13/725,619 dated Mar. 31, 2016, 26 pages.
Non-Final Office Action for U.S. Appl. No. 13/677,060 dated Mar. 10, 2016, 66 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
Office Action for U.S. Appl. No. 14/658,365, dated Mar. 23, 2017, 100 pages.
Chinese Office Action for CN Application Serial No. 201410196150.4, dated Mar. 2, 2017, 37 pages (with English Translation).
Office Action for U.S. Appl. No. 14/087,970, dated Apr. 12, 2017, 59 pages.
Office Action for U.S. Appl. No. 14/658,394, dated Apr. 21, 2017, 97 pages.
Office Action for U.S. Appl. No. 15/388,260, dated Apr. 24, 2017, 101 pages.
Office Action for U.S. Appl. No. 14/658,345, dated Mar. 17, 2017, 95 pages.
Office Action for U.S. Appl. No. 14/658,327, dated May 1, 2017, 99 pages.
Examiner Answer to Appeal Brief for U.S. Appl. No. 14/087,977, dated Feb. 1, 2017.
Givehchi, et al., "Control-as-a-Service from the Cloud: A Case Study for using Virtualized PLCs," 2014 10th IEEE Workshop on Factory Communication Systems (WFCS 2014), May 5, 2014 IEEE, 4 pages.
Office Action for U.S. Appl. No. 14/088,011, dated May 17, 2017.
Rouse, et al. "Definition Industrial Control System (ICS)," whatis.techtarget.com, ed. Mar. 2016 (accessed from <<http://whatis.techtarget.com/definition/industrial-control-system-ICS>> on Jan. 11, 2017).
Office Action for U.S. Appl. No. 15/490,076 dated Apr. 2, 2018, 23 pages.
Office Action for U.S. Appl. No. 14/658,327 dated Apr. 10, 2018, 43 pages.
Office Action for U.S. Appl. No. 14/658,345 dated Mar. 14, 2018, 56 pages.
Office Action for U.S. Appl. No. 14/658,365 dated Apr. 5, 2018, 64 pages.
Office Action for U.S. Appl. No. 14/658,394, dated Apr. 6, 2018, 40 pages.
Office Action for U.S. Appl. No. 15/143,733, dated Jun. 18, 2018, 76 pages.
Office Action for U.S. Appl. No. 15/599,921, dated Jun. 29, 2018, 75 pages.
Office Action for U.S. Appl. No. 14/087,970, dated Aug. 1, 2018, 68 pages.
Wikipedia; "PID Controller"; Jul. 20, 2018; https://en.wikipedia.org/wiki/PID_controller (Year: 2018).
Communication pursuant to Article 94(3) EPC for EP Application Serial No. 14167714.6 dated Aug. 3, 2018, 5 pages.
Communication pursuant to Article 94(3) EPC for EP Application Serial No. 14167708.8 dated Aug. 3, 2018, 5 pages.
Communication pursuant to Article 94(3) EPC for EP Application Serial No. 14167712.0 dated Aug. 3, 2018, 5 pages.
Search Report received for Chinese Application Serial No. 201610149668.1 dated Apr. 2, 2018, 1 page.
First Office Action received for Chinese Patent Application Serial No. 201610151380.8 dated Jul. 17, 2018, 65 pages.
Office Action for U.S. Appl. No. 14/658,345, dated Sep. 13, 2018, 79 pages.
Search Report received for Chinese Application Serial No. 201610149635.7 dated Apr. 2, 2018, 1 page.

SMART DEVICE FOR INDUSTRIAL AUTOMATION

RELATED APPLICATIONS

This application is a continuation of, and claims priority to, U.S. patent application Ser. No. 13/725,660, filed on Dec. 21, 2012, and entitled "SMART DEVICE FOR INDUSTRIAL AUTOMATION." This application claims the benefit of U.S. Provisional Patent Application Ser. No. 61/587,531, filed on Feb. 9, 2012, and entitled "INDUSTRIAL AUTOMATION CLOUD COMPUTING SYSTEMS AND METHODS." This application is also related to U.S. patent application Ser. No. 10/162,315, filed on Jun. 4, 2002 (which issued as U.S. Pat. No. 7,151,966 on Dec. 19, 2006), and entitled "SYSTEM AND METHODOLOGY PROVIDING OPEN INTERFACE AND DISTRIBUTED PROCESSING IN AN INDUSTRIAL CONTROLLER ENVIRONMENT." The entireties of these applications are incorporated herein by reference.

TECHNICAL FIELD

The subject application relates generally to industrial automation, and, more particularly, to cloud-aware smart devices for use in an industrial automation environment.

BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures. In general, industrial controllers read input data from sensors and metering devices that provide discreet and telemetric data regarding one or more states of the controlled system, and generate control outputs based on these inputs in accordance with the user-defined program.

In addition to industrial controllers and their associated I/O devices, some industrial automation systems may also include low-level control systems, such as vision systems, barcode marking systems, variable frequency drives, industrial robots, and the like which perform local control of portions of the industrial process, or which have their own localized control systems.

The collection of industrial devices making up a given industrial automation system is constantly in flux. As a result of system expansions, maintenance concerns, and device upgrades, industrial devices are continually being added, removed, switched, and replaced. This dynamic device movement often requires considerable labor and downtime to ensure that new devices are properly integrated and represented within the system. This includes not only ensuring that the new device is correctly configured to perform its role within the industrial system, but also that the new device interacts properly with other devices in the system. Moreover, applications that rely on data generated by the industrial devices (e.g., reporting applications, human-machine interfaces, enterprise resource planning systems, etc.) must be reconfigured to incorporate the new device.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to a cloud-aware smart device capable of automatic integration with cloud-based applications and services. In one or more embodiments, the cloud-aware smart device can be configured to automatically communicate with a cloud-platform when added to an existing industrial automation system, and to send identification and configuration information to the cloud platform to facilitate simplified and automated integration with the larger system. For example, the cloud-aware smart device can generate a device profile that include such information as a device identifier, a geographical location, a location within an overall enterprise or plant hierarchy, a device role, identification of other devices in proximity to the smart device, and other such information. Cloud-based applications and services residing on the cloud platform can leverage information in the device profile to integrate the new smart device into the system as a whole. This can include updating cloud-based applications to recognize the new device, adding the new device to a dynamically updated data model of the industrial enterprise or plant, making other devices on the plant floor aware of the new device, or other such integration functions.

To facilitate generation of the device profile, one or more embodiments of the cloud-aware smart device can be configured to recognize its context within the overall automation system. For example, the smart device can recognize and identify other devices in its proximity and include this information in the device profile. This information can be provided to external applications (e.g., cloud-based device management applications, historian applications, operator interface applications, ERP systems, etc.) to facilitate awareness of the new device's location within the enterprise hierarchy.

Once the smart device has been installed and integrated with the cloud-based applications and/or services, the device can push data to the cloud platform or pull data from the cloud platform as needed. In some embodiments, the smart device can tag such data with contextual information (e.g., location, time stamp, etc.) prior to pushing the data to the cloud platform.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
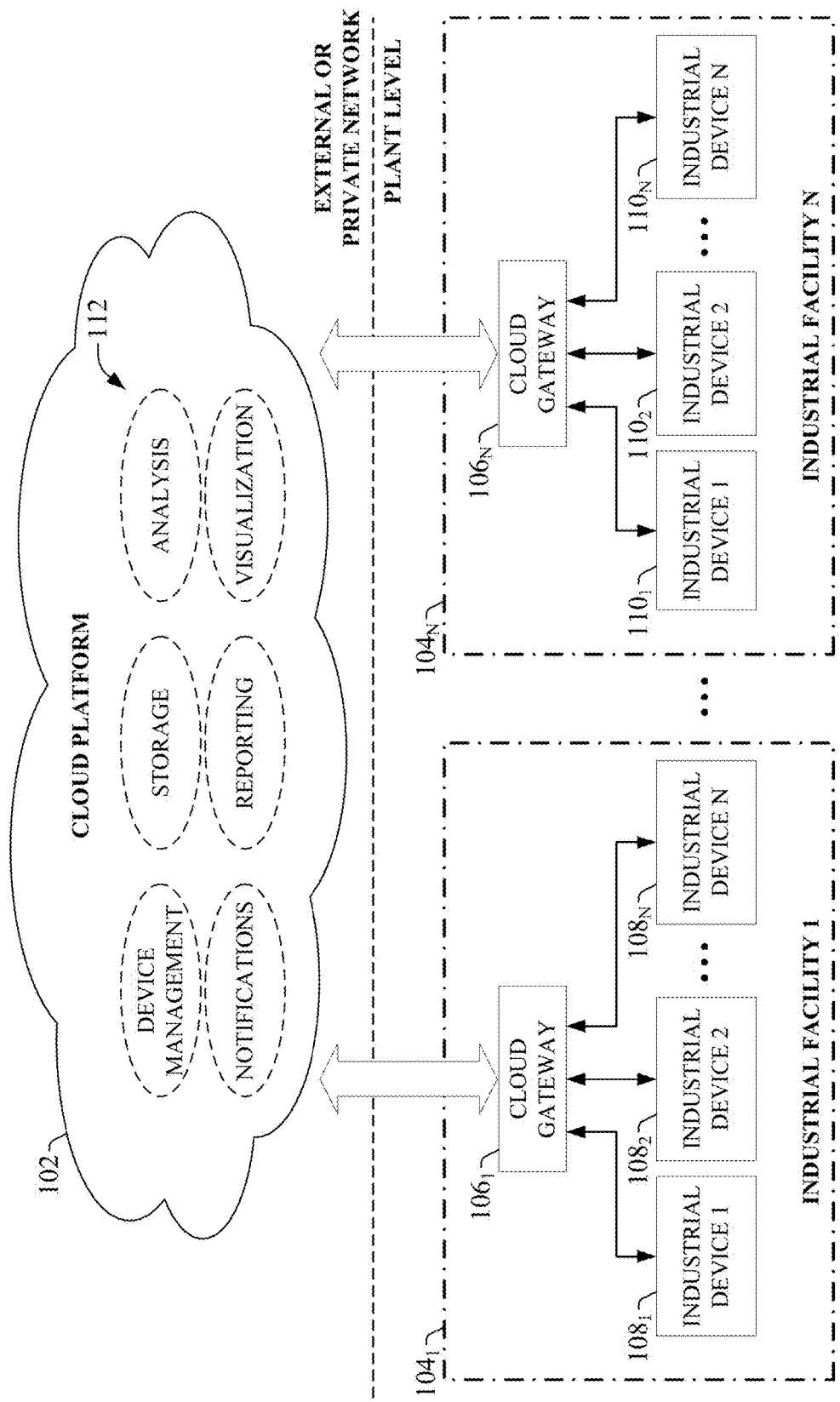
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

To provide a general context for the cloud gateway devices and services described herein, FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; human-machine interfaces (HMIs); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices may also be part of a mobile control and/or monitoring application, such as a system contained in a truck or other service vehicle.

According to one or more embodiments of this disclosure, industrial devices 108 and 110 can be coupled to a cloud platform 102 to leverage cloud-based applications and services. That is, the industrial devices 108 and 110 can be configured to discover and interact with cloud-based computing services 112 hosted by cloud platform 102. Cloud platform 102 can be any infrastructure that allows shared computing services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 can reside and execute on the cloud platform 102 as a cloud-based service. In some such configurations, access to the cloud platform 102 and associated services 112 can be provided to customers as a subscription service by an owner of the services 112. Alternatively, cloud platform 102 can be a private cloud operated internally by the enterprise. An exemplary private cloud platform can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of near real-time system data or other factors), device management applications, visualization applications such as cloud-based operator interfaces, reporting applications, Enterprise Resource Planning (ERP) applications, notification services, or other such applications. If cloud platform 102 is a web-based cloud, industrial devices 108 and 110 at the respective industrial facilities 104 may interact with cloud services 112 via the Internet. In an exemplary configuration, industrial devices 108 and 110 may access the cloud services 112 through separate cloud gateways 106 at the respective industrial facilities 104, where the industrial devices 108 and 110 connect to the cloud gateways 106 through a physical or wireless local area network or radio link. In another exemplary configuration, the industrial devices 108 and 110 may access the cloud platform directly using an integrated cloud gateway service, as will be described in more detail herein.

Providing industrial devices with cloud capability via cloud gateways 106 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud platform 102 for aggregation, collation, collective analysis, and enterprise-level reporting without the need to establish a private network between the facilities. Industrial devices 108 and 110 and/or cloud gateways 106 having smart configuration capability can be configured to automatically detect and communicate with the cloud platform 102 upon installation at any facility, simplifying integration with existing cloud-based data storage, analysis, or reporting applications used by the enterprise. In another exemplary application, cloud-based diagnostic applications can access the industrial devices 108 and 110 via cloud gateways 106 to monitor the health of respective automation systems or their associated industrial devices across an entire plant, or across multiple industrial facilities that make up an enterprise. In another example, cloud-based lot control applications can be used to track a unit of product through its stages of production and collect production data for each unit as it passes through each stage (e.g., barcode identifier, production statistics for each stage of production, quality test data, abnormal flags, etc.). These industrial cloud-computing applications are only intended to be exemplary, and the systems and methods described herein are not limited to these particular applications. As these examples demonstrate, the cloud platform 102, working with cloud gateways 106, can allow builders of industrial applications to provide scalable solutions as a service, removing the burden of maintenance, upgrading, and backup of the underlying infrastructure and framework.

Figure 2:
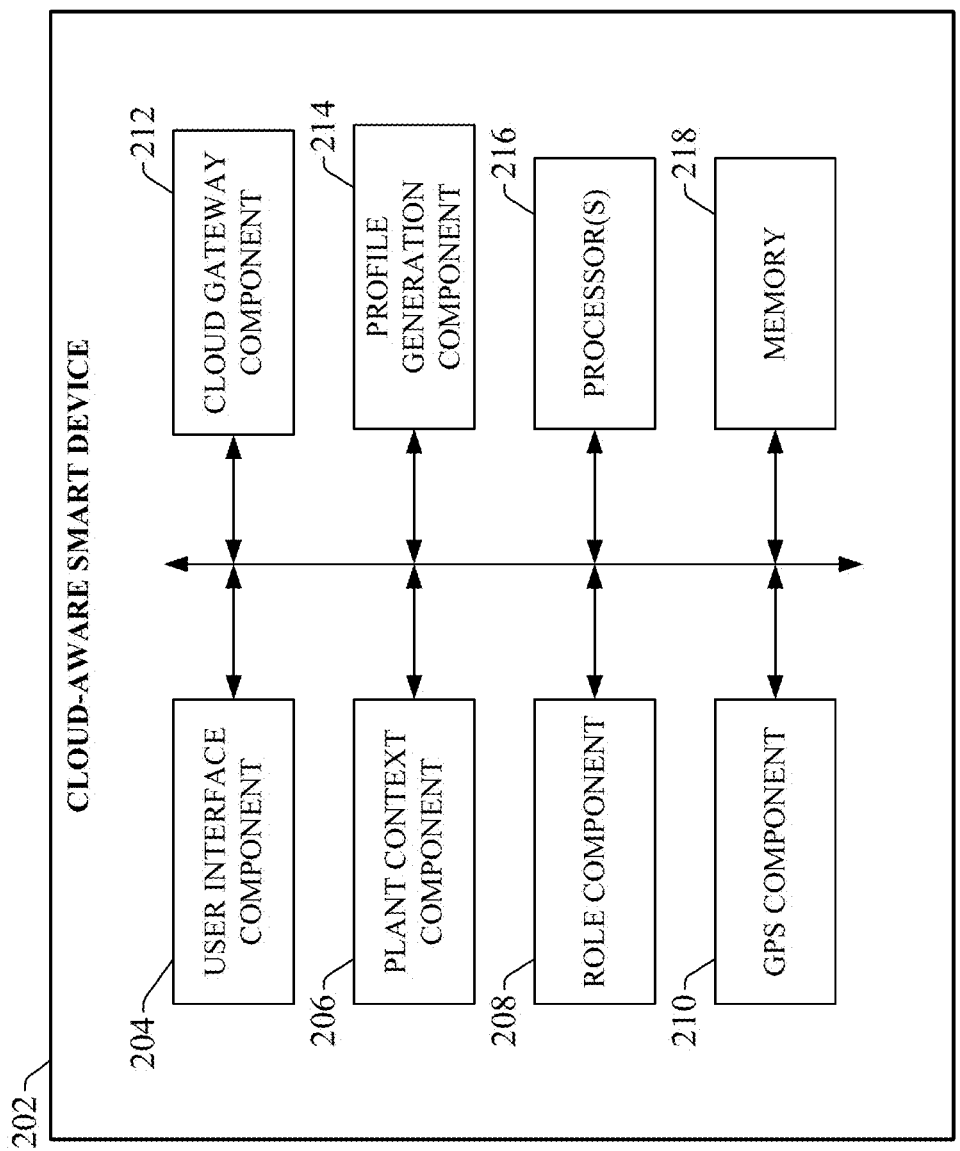
FIG. 2 is a block diagram of an exemplary cloud-aware smart device.

FIG. 2 is a block diagram of an exemplary cloud-aware smart device according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud-aware smart device 202 can include a user interface component 204, a plant context component 206, a role component 208, a GPS component 210, a cloud interface component 212, a profile generation component 214, one or more processors 216, and memory 218. In this context, the GPS component is to be understood as a general localization provider, which may be based on GPS, wireless triangulation, or manually entered location information. In various embodiments, one or more of the user interface component 204, plant context component 206, role component 208, GPS component 210, cloud interface component 212, profile generation component 214, the one or more processors 216, and memory 218 can be electrically and/or communicatively coupled to one another to perform one or more of the functions of the cloud-aware smart device 202. In some embodiments, components 204, 206, 208, 210, 212, and 214 can comprise software instructions stored on memory 218 and executed by processor(s) 216. Cloud-aware smart device 202 may also interact with other hardware and/or software components not depicted in FIG. 2. For example, processor(s) 216 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). User input can be, for example, configuration information defining whether the cloud-aware smart device 202 is allowed to push data to and/or pull data from a cloud platform. User input can also comprise address information for a particular cloud platform or application with which the cloud-aware smart device 202 is to communicate. Plant context component 206 can be configured to identify a context of the cloud-aware smart device 202 within a plant environment. This can include, for example, identifying other industrial devices in proximity to or sharing a plant network with cloud-aware smart device 202, identifying a location of the cloud-aware smart device 202 within a the overall enterprise or plant hierarchy, identifying data tags associated with the cloud-aware smart device 202 and available for retrieval by cloud applications, and other such information.

Role component 208 can be configured to determine a role of the cloud-aware smart device 202 within the industrial automation system. Such information can be provided to the cloud platform as part of the device profile. GPS component 210 can be configured to determine a geographical location of the cloud-aware smart device 202. Cloud interface component 212 can be configured to couple the cloud-aware smart device to a web-based or private cloud platform and exchange data with the cloud platform. Profile generation component 214 can be configured to generate a device profile for the cloud-aware smart device 202 based on information provided by plant context component 206, role component 208, and/or GPS component 210. The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Cloud aware smart device 202 can be virtually any type of device used in conjunction with monitor and/or control of an industrial automation system, including but not limited to an industrial controller (e.g., programmable logic controllers or other types of programmable automation controllers); a field device such as a sensor and meter; a motor drive; a human-machine interface (HMI) or other type of operator interface; an industrial robot, a barcode marker or reader; a vision system device (e.g., vision camera); a smart welder; or other such industrial devices. In one or more embodiments, such industrial devices can include capabilities to automatically communicate with a cloud platform and provide information about the device's context, role, location, etc. to facilitate automatic integration with one or more cloud-based applications or services, as well as integration with other components of the industrial system.

Figure 3:
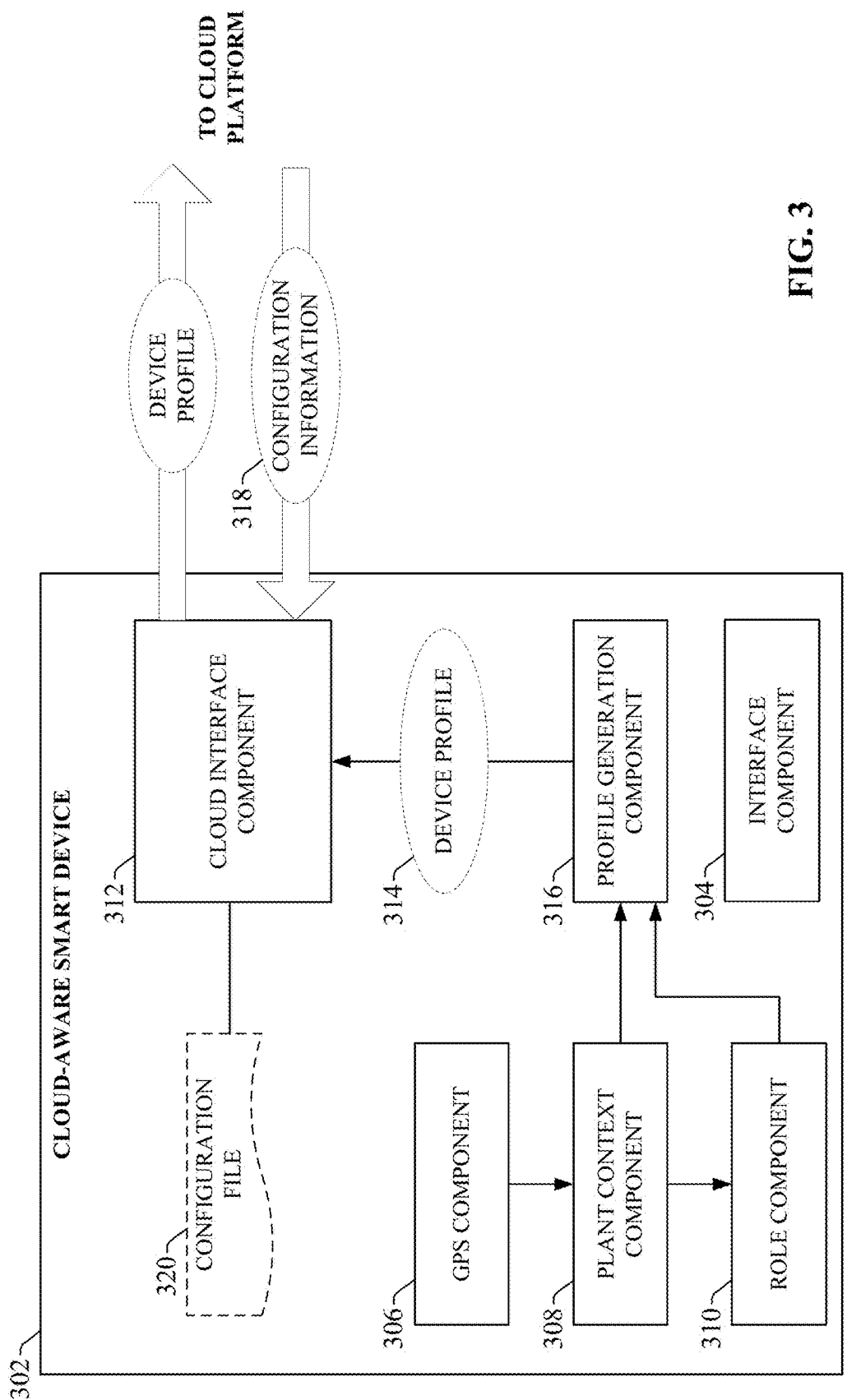
FIG. 3 is a block diagram of an exemplary cloud-aware smart device capable of exchanging data with a cloud platform.

FIG. 3 illustrates an exemplary cloud-aware smart device capable of exchanging data with a cloud platform. Cloud-aware smart device 302 includes a cloud interface component 312 configured to communicatively couple cloud-aware smart device 302 to a cloud platform and exchange data therewith. If cloud-aware smart device is Internet-capable, cloud interface component 312 can provide access to the cloud platform via an Internet layer. Although cloud interface component 312 is depicted in FIG. 3 as exchanging data directly with the cloud platform, one or more embodiments of cloud interface component 312 can be configured to exchange data with the cloud platform through a separate cloud gateway device, as described in more detail below.

When cloud-aware smart device 302 is installed as part of an industrial automation system, cloud interface component 312 can establish communication with a specified cloud platform (e.g., a cloud platform allocated for use by an owner of the industrial automation system). In one or more embodiments, cloud interface component can determine an address of the cloud platform based on a configuration file 320 associated with cloud-aware smart device 302. Configuration file 320 can specify, for example, a URL (uniform resource locator) of the cloud platform.

As part of the installation sequence, profile generation component 316 can generate a device profile 314 for cloud-aware smart device 302 to be sent to the cloud platform via cloud interface component 312. Device profile 314 can convey information about cloud-aware smart device 302 (e.g., device capabilities, context within the industrial automation system, role, etc.) to one or more cloud-based applications or services on the cloud platform. To this end, profile generation component 316 can leverage information provided by one or more of the plant context component 308 or role component 310.

Plant context component 308 can determine a context of cloud-aware smart device 302 within the plant or enterprise environment. For example, one or more embodiments of plant context component 308 can identify other devices and systems within its local environment and make a determination regarding a location of cloud-aware smart device 302 within a hierarchical plant context or device topology. For example, some cloud-based applications may model a given industrial enterprise in terms of multiple hierarchical levels and device hierarchies, where each level comprises units of the enterprise organized as instances of types and their properties. Exemplary types can include, for example, assets (e.g., pumps, extruders, tanks, fillers, welding cells, utility meters, etc.), structures (e.g., production lines, production areas, plants, enterprises, production schedules, operators, etc.), and processes (e.g., quality audit, repairs, test/inspection, batch, product parameters, shifts, etc.).

Figure 4:
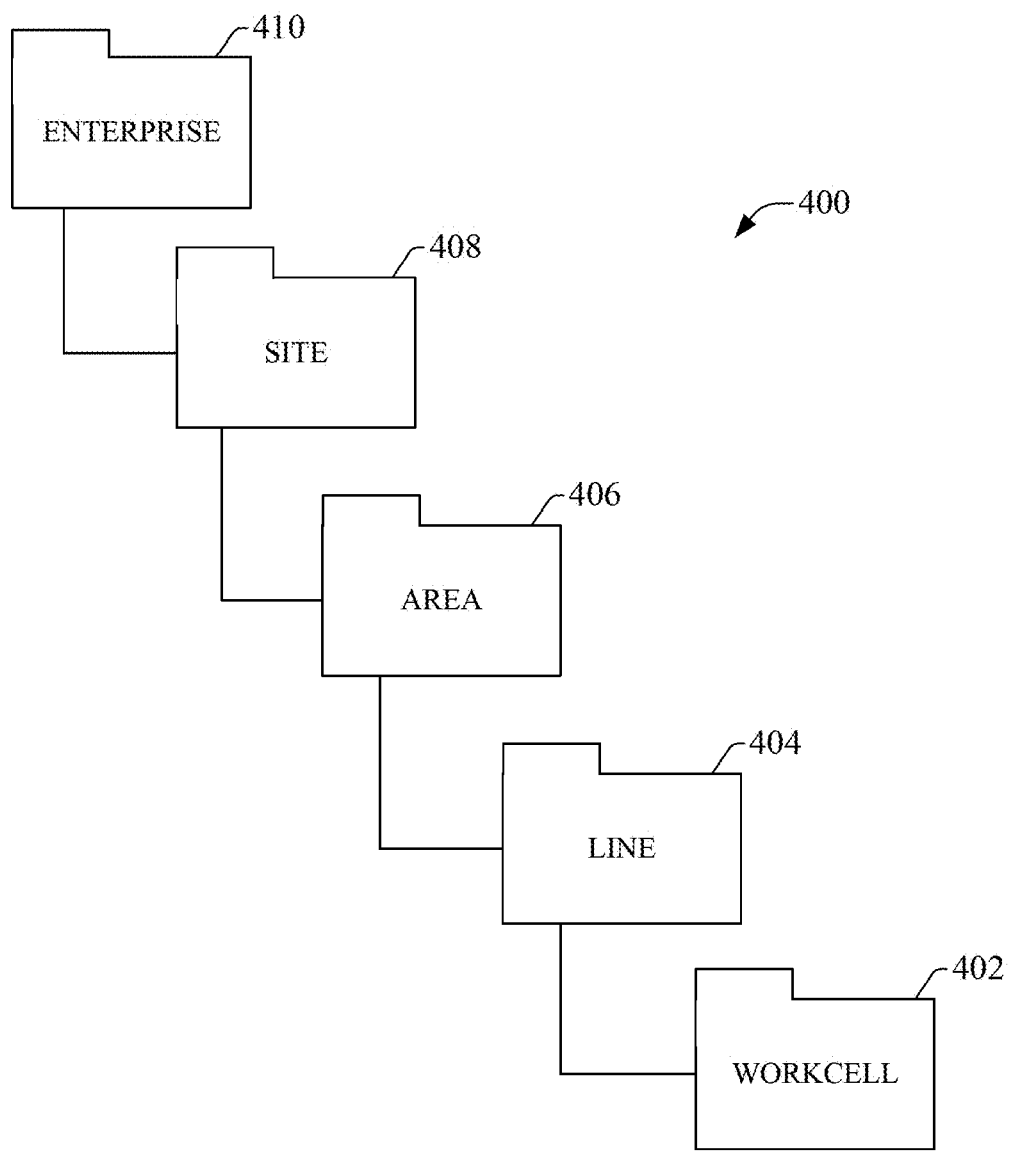
FIG. 4 illustrates an exemplary organizational hierarchy that can be used as a basis for modeling an industrial enterprise.

Turning briefly to FIG. 4, an exemplary organizational hierarchy 400 that can be used as a basis for modeling an industrial enterprise is illustrated. In this exemplary organizational model, the hierarchical levels can include—from lowest to highest—a workcell level 402, a line level 404, an area level 406, a site level 408, and an enterprise level 410. The type instances described above—representing units of the enterprise—can be defined for respective levels of this hierarchical structure. Modeling an industrial enterprise in this fashion can allow devices of an automation system and their associated data to be described and identified in terms of these hierarchical levels, allowing a common terminology to be used across the entire enterprise to identify devices and their associated data. Thus, individual devices or items of data (e.g., live analog and digital values stored in controller tags, archived data values stored in a historian register or other long-term data storage device, etc.), when integrated into a framework that accords to such a hierarchical model, can be identified and viewed through using unique data tags that conform to a unified, hierarchical naming and browsing convention. For example, through adherence to a data model based on organizational hierarchy 400, a given item of data within an industrial system can be identified with a data tag or identifier that indicates the data item's origin or context within the organizational hierarchy (e.g., SoCal:DieCastArea:#1HeadlineMachine:DowntimeTracking:DowntimeMinutes). Applications and services that model an enterprise according to organizational hierarchy 400 can represent industrial controllers, devices, machines, or processes as data structures (e.g., type instances) within this organizational hierarchy to provide context for data generated and stored by devices within the enterprise relative to the enterprise as a whole. Such a convention can replace the flat name structure employed by some industrial applications.

Returning now to FIG. 3, plant context component 308 can gather information that facilitates locating a cloud-aware smart device 302 within an organizational or device hierarchy in a number of ways. In one example, plant context component 308 can identify a topology of devices sharing a common network with cloud-aware smart device 302 and interconnections between the devices. For example, if cloud-aware smart device 302 is an industrial controller, plant context component 308 can identify one or more discrete or analog I/O devices connected to the controller. Plant context component 308 can also identify one or more low-level control systems that exchange data with the controller, such as vision systems, barcode marking systems, variable frequency drives, industrial robots, or the like which perform local control of portions of the industrial process, or which have their own localized control systems, but which are subservient to the industrial controller. In addition, plant context component 308 can identify other controllers on the network and their role within the overall industrial enterprise (e.g., the production areas, workcells, or processes associated with the respective controllers). In some embodiments, plant context component 308 can also determine an identity of a particular network (e.g., a network name) to which cloud-aware smart device 302 is attached. This information can be leveraged (either by profile generation component 316 or an external application) to determine the device's location and role within the industrial automation system, since some networks may be dedicated to a particular production area. Some embodiments of plant context component 308 may also identify a type of machine to which cloud-aware smart device 302 is connected (e.g., a palletizer, wrapper, conveyor, etc.).

To facilitate determining the plant context of cloud-aware smart device 302, plant context component 308 may also leverage global positioning (GPS) information provided by GPS component 306. GPS component 306 can determine a geographical location of cloud-aware smart device 302. In one or more embodiments, GPS component 306 can comprise an integrated GPS that determines the location using satellite navigation signals. In other embodiments, GPS component 306 can employ non-GPS technique to determine location (e.g., wireless triangulation). Location data provided by GPS component 306 can be use to determine a placement of cloud-aware smart device 302 within the enterprise or device hierarchy. For example, based on the GPS location data, plant context component 308 (or a cloud-based application in receipt of device profile 314) can determine that cloud-aware smart device 302 is located at a particular plant facility, or within a particular production area of a plant. Based on this information, profile generation component 316 determines that cloud-aware smart device 302 is associated with the particular facility and/or production area within the enterprise hierarchy By gathering information about the local device topology, plant context component 308 can facilitate identifying a location of cloud-aware smart device 302 within the enterprise hierarchy. In some embodiments, this determination of the location within the enterprise hierarchy can be made by plant context component 308 itself. Alternatively, profile generation component 316 can include information gathered by plant context component in device profile 314 so that an external application (e.g., a cloud-based application) can accurately represent cloud-aware smart device 302 within the enterprise or device hierarchy.

Role component 310 can generate information regarding a role of cloud-aware smart device 302 within the industrial automation system. This role information can be based a type of the device (e.g., industrial controller, telemetry device, sensor, human-machine interface terminal, vision camera, variable frequency drive, etc.) combined with system-specific context information, such as information gathered by plant context component 308. For example, if cloud-aware smart device 302 is an HMI terminal, and information generated by plant context component 308 determines that the HMI terminal is connected to an industrial controller that monitors and controls a particular batch process in a particular production area of the plant, role component 310 can determine that the role of cloud-aware smart device 302 is to act as an operator interface for the batch process. Likewise, if cloud-aware smart device 302 is a variable frequency drive, role component 310 can determine that the role is to control a motor within a particular production area or in connection with a batch process identified by plant context component 308.

Profile generation component 316 can aggregate information from one or more of the plant context component 308 or role component 310 into device profile 314, which can then be passed to cloud interface component 312 for delivery to one or more cloud-based applications or services on the cloud platform (e.g., the cloud platform identified in configuration file 320). This information can be used by the cloud-based applications in a number of ways. For example, based on information in device profile 314, a cloud-based device management application or other such service can deliver suitable configuration information 318 to cloud-aware smart device 302 that automatically configures the device for operation within its determined environment. Configuration information 318 can, for example, instruct cloud-aware smart device 302 which data items are to be exchanged with a disparate device in connection with monitoring and/or controlling a given industrial process. This can include automatically configuring one or more data tags within cloud-aware smart device 302 for communication with appropriate data tags within the disparate device, thereby establishing a communicative link between the devices. Configuration information 318 can also configure one or more operating parameters of cloud-aware smart device 302 based on information in device profile 314 and information about the industrial system (e.g., the enterprise or device hierarchy) maintained on the cloud platform.

Cloud-aware smart device 302 can also include interface component 304, which receives user input data and/or renders output data to the user. Capabilities of interface component 304 depend on the type of the smart device. For example, interface component 304 may be associated with a touch screen if cloud-aware smart device 302 is an HMI terminal or a device having a touch-sensitive configuration and display screen. Interface component 304 can also allow the user to enter certain cloud-specific configuration information in connection with one or more functions described above. For example, a user may interact with interface component 304 to set an address (e.g. a uniform resource locator) of the cloud platform. Users may also interact with interface component 304 to configure whether cloud-aware smart device 302 is allowed to push data to or pull data from the cloud platform. Interface component 304 may also render an indication that cloud-aware smart device 302 has been successfully integrated with the system after configuration information 318 has been received and processed.

Figure 5:
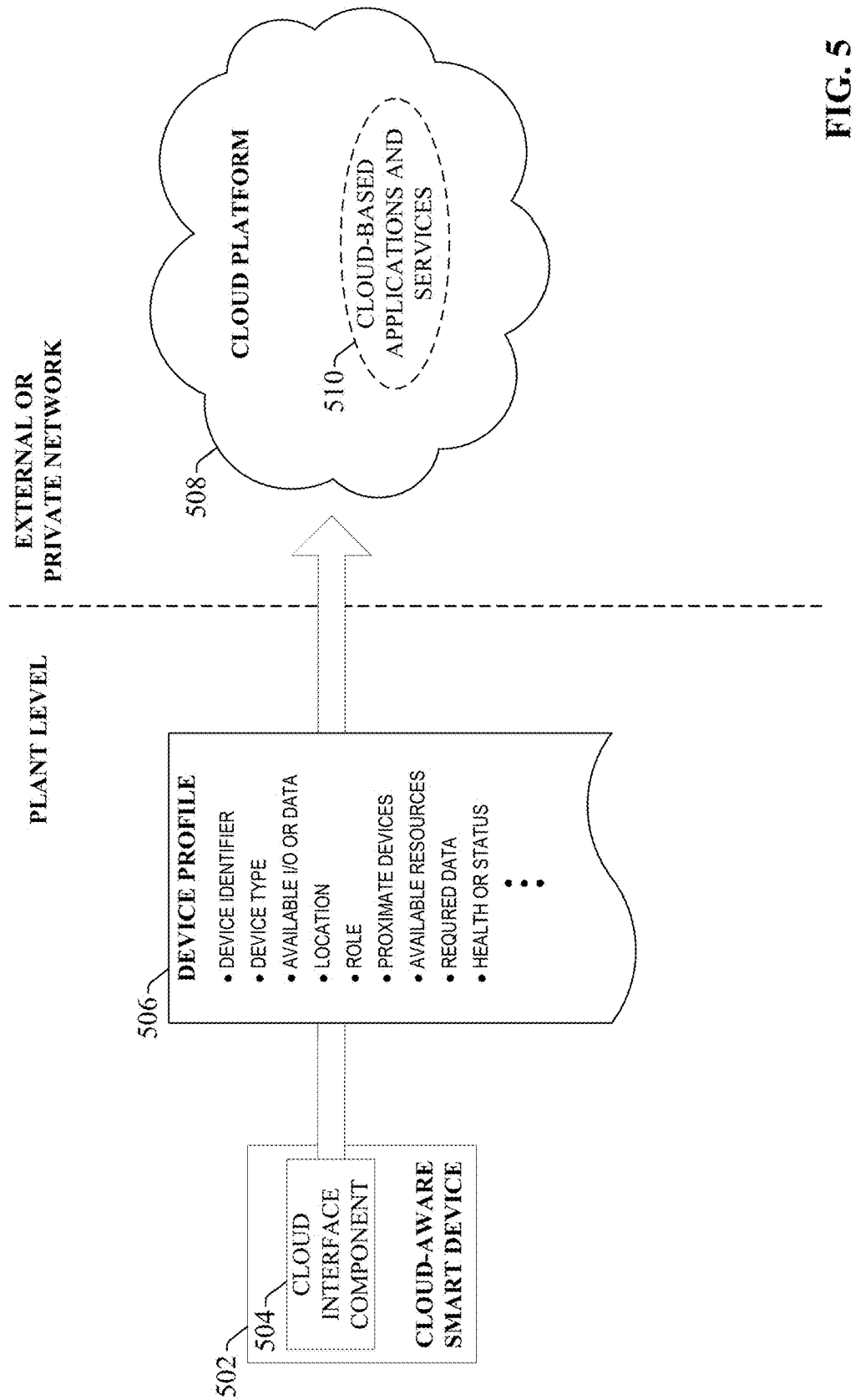
FIG. 5 illustrates delivery of an exemplary device profile for a cloud-aware smart device to a cloud platform.

FIG. 5 illustrates delivery of an exemplary device profile for a cloud-aware smart device to a cloud platform. As described above, cloud-aware smart device 502 generates a device profile 506, and sends this profile to cloud platform 508 via cloud interface component 504 (similar to cloud interface component 312 of FIG. 3). Information in device profile 506 can be leveraged by cloud-based applications and services 510 running on cloud platform 508 to facilitate configuration and management of cloud-aware smart device 502 in accordance with its particular role and location within the greater enterprise hierarchy.

Device profile 506 can include a device identifier that uniquely identifies a name of cloud-aware smart device 502, as well as information specifying a type of the device (e.g., industrial controller, VFD, HMI terminal, sensor, meter, machining robot, etc.). Device profile 506 can also include a list of available I/O or other data items associated with cloud-aware smart device 502. For example, if cloud-aware smart device 502 is an industrial controller, device profile 506 can identify one or more controller tags configured in the controller's data table, thereby informing cloud-based applications and services 510 of the available data items made available by the controller. In one or more embodiments, profile generation component 316 can determine at least some of this information by examining the controller's I/O module configuration to identify field devices associated with the controller's respective I/O data points. If cloud-aware smart device is a machine-level or plant-level data historian, device profile 506 can identify available archived data values available for retrieval from the historian. This information can be used, for example, by cloud-based historian clients or reporting applications to facilitate location and retrieval of relevant data from devices distributed throughout various areas or levels of a plant.

In addition to information about a location and role of cloud-aware smart device 502, as well as devices proximate to the device, device profile 506 can report an available amount of resources to cloud platform 508. This can include, for example, available storage or processing resources, available I/O points, available bandwidth, or other such resource information. In an exemplary scenario, a cloud-based device management application can leverage this information to manage load balancing between industrial devices. In another scenario, a cloud-based historian application can use the available resource information collected from multiple devices to determine whether historian data stored on a first device should be migrated to a second device having faster processing capability, thereby facilitating quicker retrieval times for the data.

Device profile 506 can also indicate data items that are required by cloud-aware smart device 502. For example, cloud-aware smart device 502 may be a variable frequency drive (VFD) that controls a speed and direction of a motor that drives a pump, and requires a pressure value from a pressure meter associated with the pump for its operation. This data requirement can be included in device profile 506, and can be used by a cloud-based device management service to remotely configure a tag within the VFD (e.g., using configuration information 318) that points to the appropriate data tag in the meter (or another location that has the required data, such as a live data server that reads the pressure value from the meter). The device management service can locate the required data, for example, by referencing a data model of the industrial system maintained by the service (as described above in connection with FIG. 4). Profile generation component 316 can also include device health or status information in device profile 506. This information can be used by some cloud-based applications to remotely manage device functionality (e.g., instruct a device to take over functions of a second device that reports an inoperable status), generate event-based notifications reporting an inoperable device, or other such functions.

Figure 6:
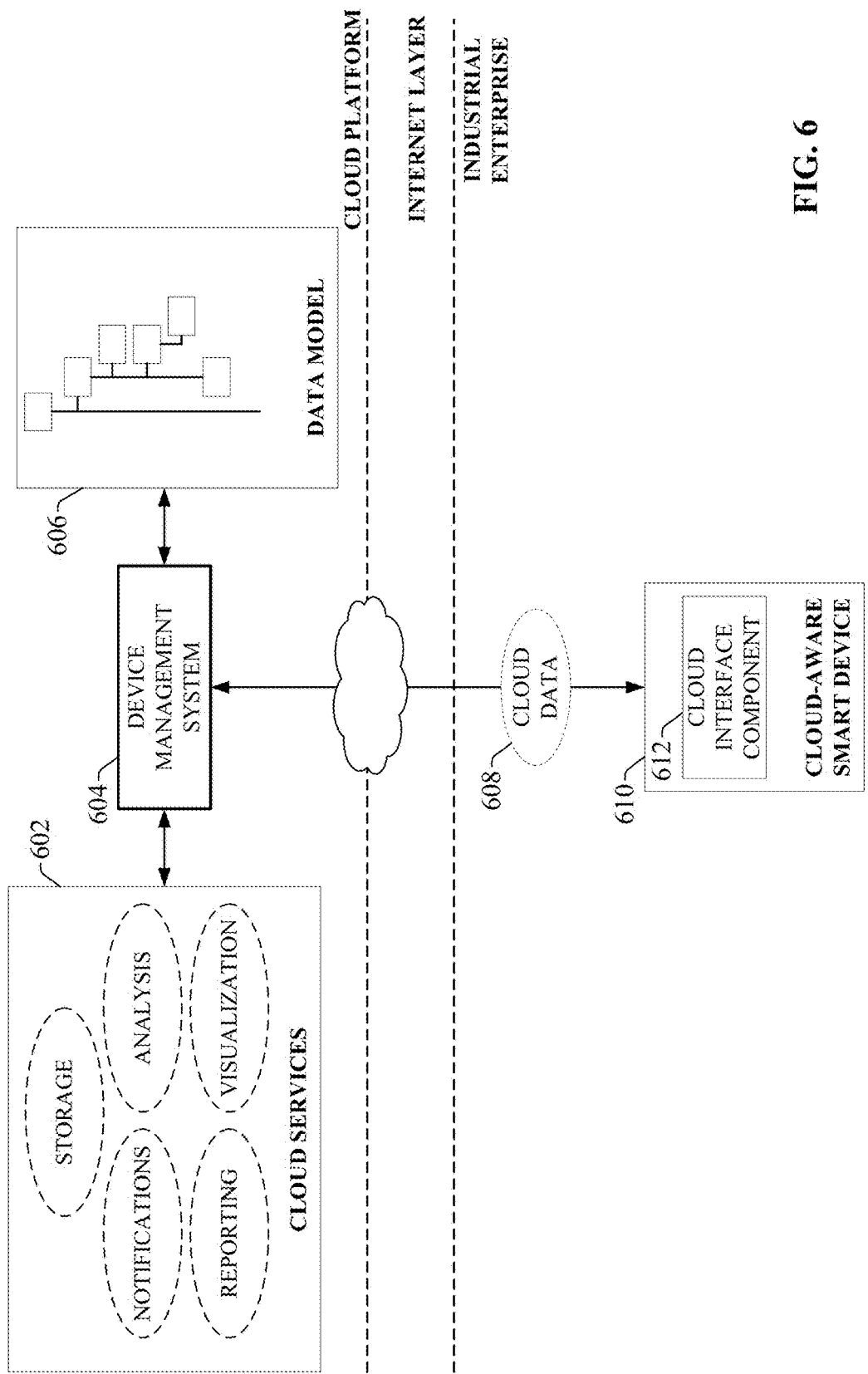
FIG. 6 illustrates automatic integration of a cloud-aware smart device within a larger device hierarchy.

FIG. 6 illustrates automatic integration of a cloud-aware smart device within a larger device hierarchy. As in previous examples, a cloud-aware smart device 610 installed as part of an industrial automation system within an industrial enterprise communicates with a cloud platform through an Internet layer. In some scenarios, cloud interface component 612 can initiate communication with the cloud platform upon installation and power-up of cloud-aware smart device, where the particular cloud platform or cloud-based application with which the device communicates can be specified in a configuration file associated with the device. Once communication is established, cloud-aware smart device 610 can begin exchanging cloud data 608 with the cloud platform. Although cloud interface component 612 is depicted in FIG. 6 as exchanging cloud data 608 directly with the cloud platform, in some scenarios cloud interface component 612 may communicate with the cloud platform via a separate cloud gateway or other proxy device, as will be described in more detail below.

In the present example, cloud-based smart device communicates with a device management system 604 running on the cloud platform. Device management system 604 can facilitate automatic and dynamic configuration of cloud-aware smart device 610 for operation within the existing industrial automation system. To this end, cloud-based device management system 604 can maintain a data model 606 that models the industrial enterprise and devices therein. Data model 606 can represent the industrial enterprise in terms of multiple hierarchical levels (e.g., the levels described in connection with FIG. 4), where each level comprises units of the enterprise organized as instances of types and their properties. Exemplary types can include, for example, assets (e.g., pumps, extruders, tanks, fillers, welding cells, utility meters, etc.), structures (e.g., production lines, production areas, plants, enterprises, production schedules, operators, etc.), and processes (e.g., quality audit, repairs, test/inspection, batch, product parameters, shifts, etc.).

Data model 606 allows devices of an automation system and data items stored therein to be described and identified in terms of these hierarchical levels, allowing a common terminology to be used across the entire enterprise to identify devices and data associated with those devices. Thus, individual items of device data (e.g., live analog and digital values stored in controller tags, archived data values stored in a historian register or other long-term data storage device, etc.), when integrated into data model 606, can be identified and viewed by other applications using unique tags defined by data model 606. For example, through adherence to data model 606, a given item of data within cloud-aware smart device 610 can be identified with a tag or identifier that indicates the data item's origin or context within the organizational hierarchy (e.g., SoCal:DieCastArea:#1HeadlineMachine:DowntimeTracking:DowntimeMinutes). Data model 606 can represent industrial controllers, devices, machines, or processes as data structures (e.g., type instances) within this organizational hierarchy to provide context for data generated and stored throughout the enterprise relative to the enterprise as a whole. Thus, data model 606 provides context enhancement that replaces the flat name structure that may be employed within the individual historians.

Device management system 604 can leverage device profile information provided by cloud-aware smart device 610 (e.g., device profile 314 or 506) to facilitate auto-discovery of the smart device and creation of corresponding data structures representing the smart device in data model 606. For example, when cloud-aware smart device 610 is added to an industrial system of an enterprise, the device's cloud interface component 612 can send a device profile for the device to device management system 604 on the cloud platform. Device management system 604 can thereby automatically detect the device and determine the device's context within the organizational hierarchy modeled by data model 606, and reconfigure data model 606 to incorporate the newly added device at the appropriate location within the organizational hierarchy. This can include identifying data tags available within cloud-aware smart device and making those data tags available for viewing or retrieval by authorized applications using the hierarchical naming structure defined by data model 606.

Cloud interface component 612 can also receive configuration information from device management system 604 (e.g., configuration information 318) that facilitates integration of the smart device with other devices of the automation system. For example, if the device profile indicates that cloud-aware smart device 610 requires a particular data value from another device for its operation (e.g., a metered pressure value for a particular flow line), device management system 604 may locate a source for the required data by accessing data model 606, and remotely configure cloud-aware smart device 610 to communicatively link to the data source. This can involve, for example, remotely configuring a data tag within cloud-aware smart device 610 to read data from a data tag in a controller, live data server, or meter that contains the required data.

In some embodiments, cloud-aware smart device 610 can generate a portion of the device hierarchy represented by data model 606, and provide this information to the cloud platform to facilitate accurately representing this portion of the device hierarchy within data model 606. For example, if cloud-aware smart device 610 is an industrial controller that monitors and/or controls one or more production areas, the smart industrial controller can generate a hierarchical representation of the production areas, production lines, workcells, etc. of which it has knowledge, as well as devices associated therewith (e.g., I/O devices or subservient control systems that interface with the industrial controller). Cloud interface component 612 can provide this portion of the enterprise hierarchy to the cloud platform, and device management system 604 can update data model 606 accordingly.

By providing device profile information to remote cloud-based applications in this manner, cloud-aware smart devices can be simply and automatically integrated into an automation system. These techniques can also facilitate dynamic management of multiple smart devices in response to system changes. For example, cloud-aware smart devices can detect and report changes in their status or changes to their surrounding context to cloud-based applications (e.g., device management system 604, historian applications, operator interface applications, etc.), which can respond accordingly in view of the overall plant topology. Data provided by cloud-aware smart device 610, together with data model 606, can be leveraged by any suitable cloud services 602 residing on the cloud platform. A number of such cloud-based applications will be described in more detail below.

Figure 7:
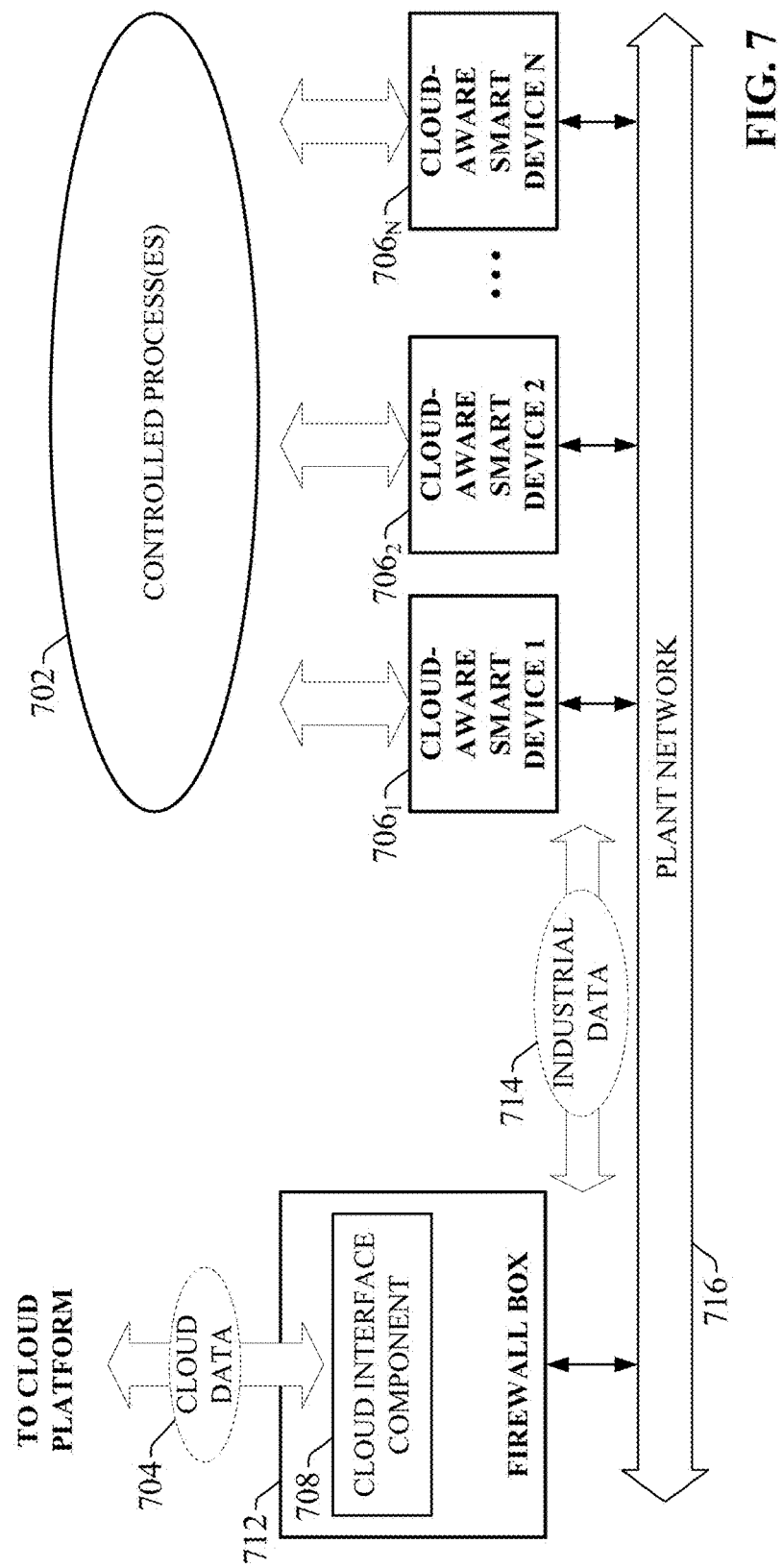
FIG. 7 illustrates an exemplary configuration in which a firewall box serves as a cloud gateway for a set of cloud-aware smart devices.

As noted above, in some exemplary configuration, cloud-aware smart devices may communicate with the cloud platform through a cloud gateway or proxy rather than communicating directly with the cloud platform. Such a configuration can mitigate exposure of mission critical industrial devices directly to the Internet by instead routing communication through a single protected proxy device. FIG. 7 illustrates an exemplary configuration in which a firewall box serves as a cloud gateway for a set of cloud-aware smart devices $706_1$-$706_N$. Cloud-aware smart devices $706_1$-$706_N$ are similar to smart devices described above. However, rather than communicate directly to the cloud platform, the cloud interface components of the respective devices communicate with cloud gateway services running on a firewall box 712. Firewall box 712 can act as a network infrastructure device that allows plant network 716 to access an outside network such as the Internet, while also providing firewall protection that prevents unauthorized access to the plant network 716 from the Internet. That is, firewall box 712 can manage transfer of data packets between the plant network 716 and the Internet to facilitate secure access to outside networks by devices on the plant network 716. In addition to these firewall functions, the firewall box 712 can include a cloud interface component 708 that interfaces firewall box 712 with one or more cloud-based applications on a cloud platform (e.g., cloud-based services 112, 510, or 602). In this exemplary embodiment, firewall box 712 can receive industrial data 714 from cloud-aware smart devices 706₁-706ₙ, which monitor and control respective portions of controlled process(es) 702. Firewall box 712 can also optionally include a transformation component (not shown), which applies suitable transformations to the gathered data prior to pushing the data to the cloud platform as cloud data 704. Firewall box 712 may also optionally include an encryption component (not shown) configured to encrypt the industrial data using any suitable encryption method. Thus, the firewall box 712 can allow cloud-aware smart devices 806₁-806ₙ to interact with the cloud platform without directly exposing the industrial devices to the Internet. Although the cloud proxy device is depicted as being a firewall box in the present example, it is to be appreciated that such a cloud proxy can be embodied on any suitable type of device (e.g., a stand-alone computer, another smart industrial device, etc.).

In one or more embodiments, cloud interface component 708 can also receive data from the cloud platform, and route this data to one or more of the cloud-aware smart devices 706₁-706ₙ. For example, a cloud-based service may be an enterprise resource management (ERP) system that analyzes production data in view of one or more defined business goals, and generates production schedule information based on the analysis. Accordingly, firewall box 712 can receive the required production data from cloud-aware smart devices 706₁-706ₙ as industrial data 714, optionally transform and/or encrypt the production data, and provide the production data to the cloud-based ERP system as cloud data 704. In response, the cloud-based ERP system can analyze the production data and generate updated production schedule information designed to ensure that one or more defined business goals are met (e.g., fulfill a given customer order, maintain total plant energy usage below a defined peak demand, etc.). The cloud-based ERP system can provide this scheduling information to the firewall box 712 (via cloud interface component 708), which can then route the scheduling information to the appropriate cloud-aware smart devices 706₁-706ₙ.

Figure 8:
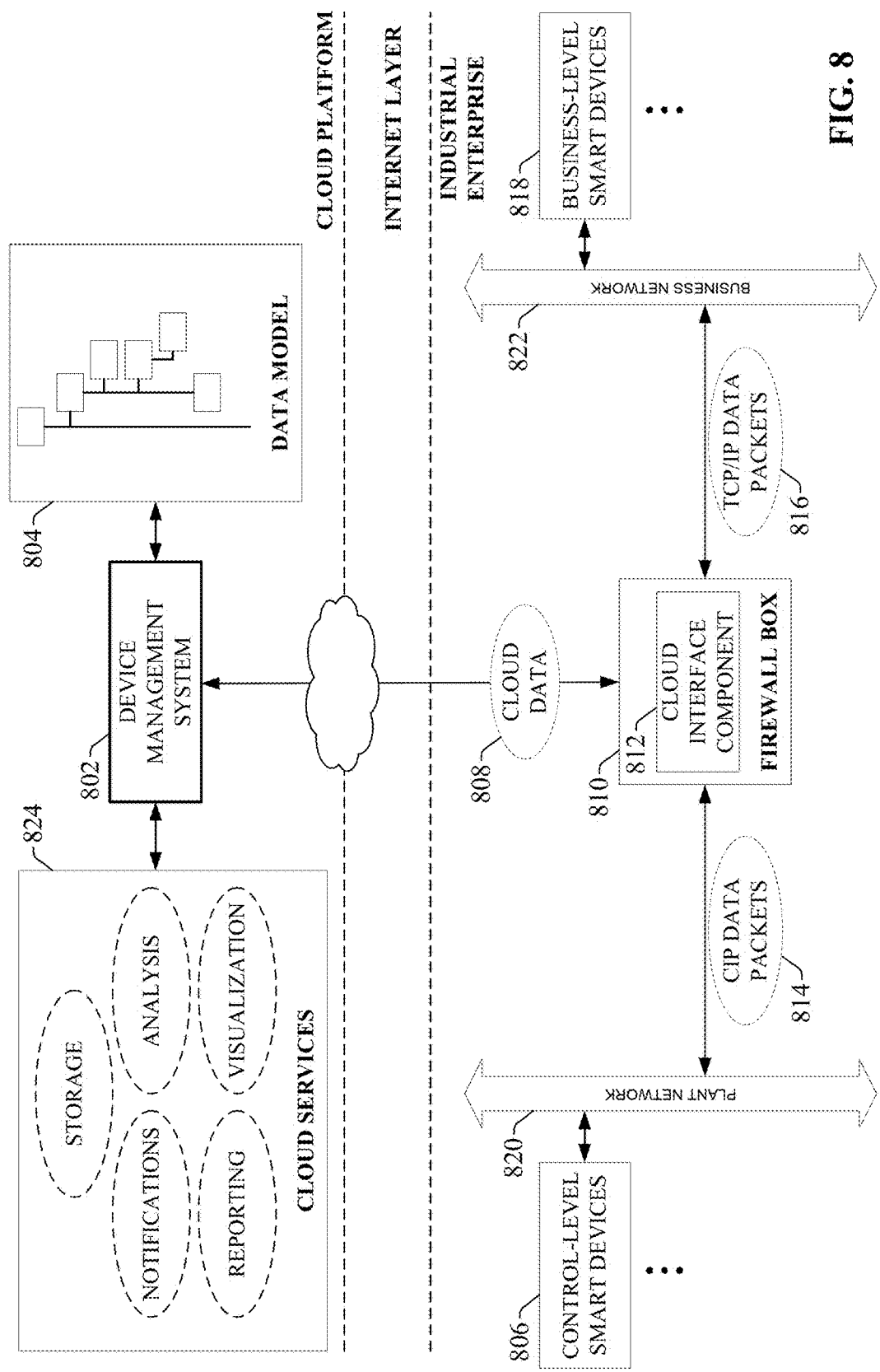
FIG. 8 illustrates an exemplary network architecture that includes a firewall box that routes smart device data from a plant level and a business level to a cloud platform.

Although the foregoing examples have focused on smart devices at the control level of the enterprise, the cloud-aware smart devices described herein can also be embodied as devices on an office or business level to facilitate comprehensive, enterprise wide integration of plant floor and business-side systems. FIG. 8 illustrates an exemplary network architecture that includes a firewall box 810 that routes smart device data from a plant level and a business level to a cloud platform. In this example, an industrial enterprise includes both a plant network 820 and business network 822. Plant network 820 communicatively connects one or more control-level smart devices 806 (e.g., industrial controllers, telemetry devices, motion devices, etc.) on the plant floor. Plant network 820 can facilitate communication between the control-level smart devices using any suitable network technology or protocol, including, but not limited to, Ethernet, Ethernet/IP, DeviceNet, ControlNet, Data Highway and Data Highway Plus (DH/DH+), Remote I/O, Fieldbus, Modbus, Profibus, wireless networks, or serial protocols. On the business level of the enterprise, business network 822 interconnects one or more business-level smart devices using a suitable office network protocol (e.g., TCP/IP over Ethernet). For example, business network 822 can be an office network that interconnects employee desktop or laptop computers to an office server, printing devices, or other office equipment. Business-level smart devices 818 can include, for example, servers that execute ERP systems, financial systems, reporting systems, billing systems, and the like. Business-level smart devices 818 can also comprise office-side visualization terminals for viewing data relating to the plant-level systems, business-level or enterprise-level historian servers that archive plant-level data for long-term storage, or other such business-level systems.

In the present example, both the plant network 820 and the business network 822 can access the Internet through firewall box 810, which manages access to outside networks while protecting both the plant network 820 and business network 822 from unauthorized access from outside entities. The firewall box 810 can also route data packets between the plant network 820 and the business network 822 (e.g., CIP data packets 814 from the plant network 820 and TCP/IP data packets 816 from the business network 822). In addition to these routing and firewall protection capabilities, firewall box 810 can include a cloud interface component 812 (similar to cloud interface component 708 described in connection with FIG. 7). For example, the cloud interface component 812 running on firewall box 810 can receive data (e.g., device profiles, status data, telemetry data, etc.) from control-level smart devices 806 over plant network 820, and send the data as cloud data 808 to the cloud platform, as described in previous examples, thereby allowing the data to be utilized by one or more cloud services running on the cloud platform. Likewise, cloud interface component 812 can receive similar device data from business-level smart devices 818 and provide this data to the cloud platform. In an exemplary configuration, a device management system 802 (similar to device management system 604) can leverage the data from smart devices on the plant level and the business level to update and maintain the organizational and device hierarchy of data model 804. Other cloud services 824 can then use data model 804 in connection with their respective functions. For example, cloud-based reporting, historian, or visualization systems can use data model 804 to locate desired data distributed throughout various plant-level and business-level smart devices of the enterprise. Data model 804 can also provide a means to browse the hierarchical namespace represented by the data model 804 to locate particular data items. In another example, cloud-based notification systems, which remotely monitor plant-floor data and generate notifications in response to defined production conditions, can reference data model 804 to determine a context for a given notification (e.g., a production area at which a notification originated, etc.).

Moreover, as with firewall box 712 of FIG. 7, some embodiments of cloud interface component 812 can receive data from cloud services 824 (e.g., a cloud-based ERP application, a cloud-based HMI application, etc.) and provision the received data to appropriate control-level or business-level smart devices. For example, a cloud-based ERP or HMI service may attempt to write a new setpoint value to a selected controller. Cloud interface component 812 can receive this new setpoint value and write the new value to the appropriate data tag in the selected controller over plant network 820.

Figure 9:
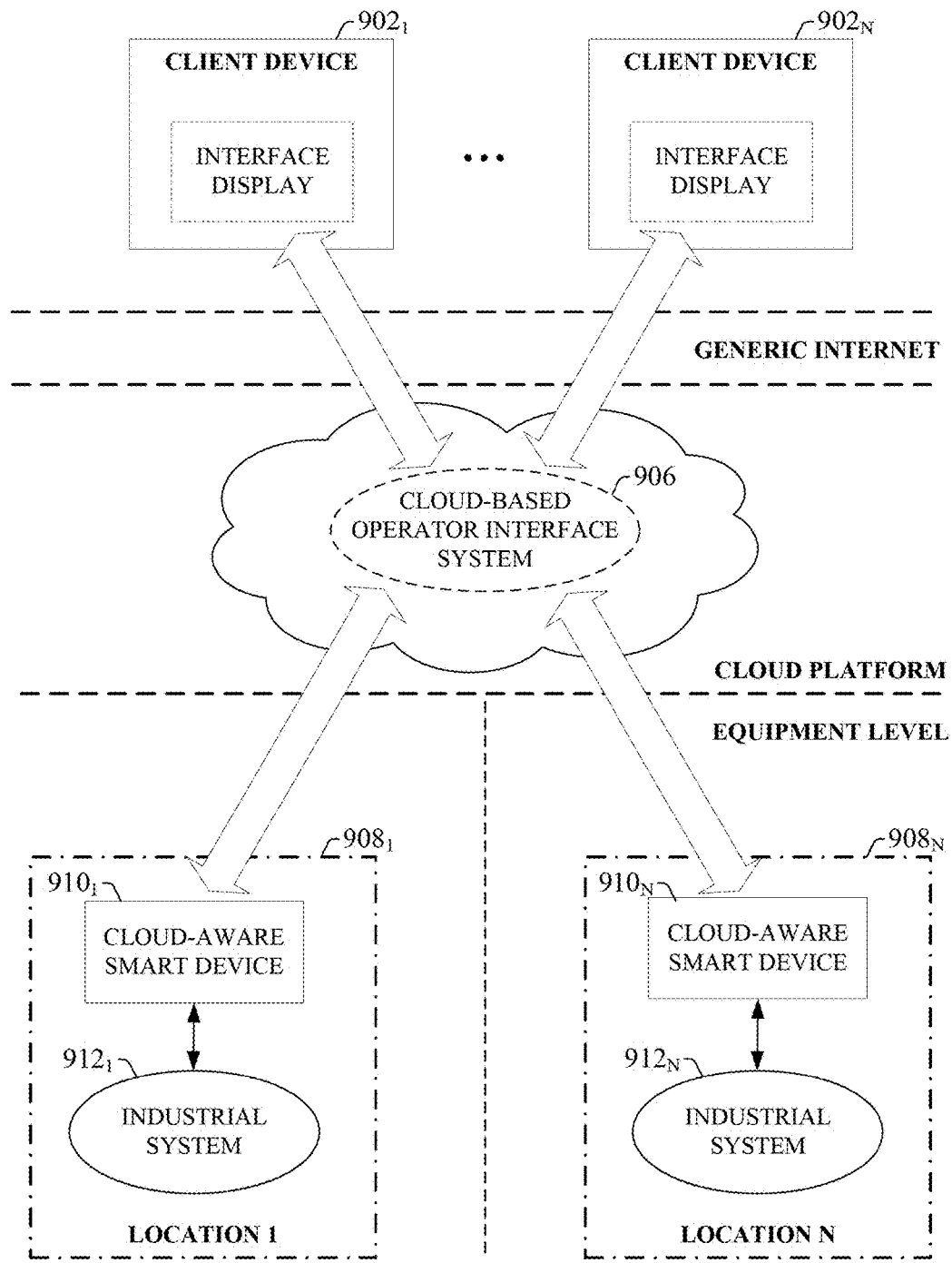
FIG. 9 is a high-level overview of a cloud-based operator interface system that collects and aggregates data from multiple smart devices and visualizes the data on Internet-capable client devices.

Providing smart industrial devices with cloud awareness can allow such devices to be easily integrated with cloud-based industrial applications. For example, FIG. 9 illustrates a high-level overview of a cloud-based operator interface system that collects and aggregates data from multiple industrial systems and visualizes the data on Internet-capable client devices. Cloud-based operator interface system 906 can interact with suitable client devices to implement substantially any type of industrial operator interface system, including but not limited to human-machine interfaces (HMIs), graphic terminal systems, industrial monitors, message display systems, or other such operator interface applications. Accordingly, the term "operator interface" as used throughout this disclosure is to be understood to encompass all such industrial display systems.

Cloud-based operator interface system 906 resides on a cloud platform. Industrial systems $912_1$-$912_N$ include respective cloud-aware smart devices $910_1$-$910_N$, which push industrial data relating to the industrial systems $912_1$-$912_N$ to the cloud platform for collection and processing at the cloud-based operator interface system 906. Industrial systems $912_1$-$912_N$ may be, for example, automation systems located at respective manufacturing or processing facilities. One or more of the industrial systems $912_1$-$912_N$ may also be mobile systems (e.g., systems embedded in service or cargo vehicles) that are to be monitored and/or controlled regardless of their location. Typically, the industrial systems $912_1$-$912_N$ will belong to a common industrial enterprise or business, and the cloud-based operator interface system 906 can be made available to the enterprise as a subscription service.

As described in previous examples, cloud-aware smart devices $910_1$-$910_N$ can generate respective device profiles upon installation, and provide these device profiles to the cloud platform. In the present example, cloud-based operator interface system 906 can leverage data provided by in the device profiles to add cloud-aware smart devices $910_1$-$910_N$ to the interface system. For example, the device profiles may include device identifiers and a list of available data points that can be provided by the respective smart devices $910_1$-$910_N$. Accordingly, cloud-based operator interface system 906 can add new graphics, text display objects, or numerical display objects to one or more operator interface screens served by the system, and link the new display objects to one or more of the available data points identified in the device profiles. In some embodiments, cloud-based operator interface system 906 can reference a hierarchical data model of the industrial enterprise (e.g., data models 606 or 804) to establish the link between the new display objects and the data points within smart devices $910_1$-$910_N$. Cloud-based operator interface system 906 can also use the hierarchical data model or data within the device profiles to determine where the new display objects should be displayed (e.g., which display screens and at which locations on the screens). For example, one of the cloud-aware smart devices $910_1$-$910_N$ may generate a device profile that includes context information specifying that the device is located in a particular production area of a particular plant facility (e.g., Location 1). Accordingly, cloud-based operator interface system 906 can determine that production data provided by this device should be located on a display screen associated with the identified production area and facility.

Once the smart devices have been configured, cloud-based operator interface system 906 can receive industrial data from the devices relating to industrial systems $912_1$-$912_N$ and make the data available to client devices $902_1$-$902_N$ associated with users having appropriate access privileges to the data. If the industrial data is to be stored for historian or reporting purposes, cloud-based operator interface system 906 can store the data on cloud-based storage associated with the cloud platform. Client devices $902_1$-$902_N$ can access cloud-based operator interface system 906 through a generic Internet level. To facilitate viewing of the industrial data, cloud-based operator interface system 906 can serve display screens to the client devices $902_k$-$902_N$ that can be viewed using the devices' native display capabilities. The display screens can be preconfigured by an administrator of the cloud-based operator interface system 906, although some embodiments can allow the owners of the client devices $902_1$-$902_N$ to customize the way the industrial data is presented on the respective devices. Client devices $902_1$-$902_N$ can be personal device such as mobile phones having graphical display capabilities, desktop or laptop computers, tablet computers, or other such devices. Client devices $902_1$-$902_N$ may also be industrial display devices such as HMI display terminals, graphic terminals, industrial monitors, message displays, television monitors, or the like.

In one or more embodiments, cloud-based operator interface system 906 can apply cloud-side processing to the industrial data to facilitate presenting the data in meaningful ways to the client devices $902_1$-$902_N$. For example, cloud-based operator interface system 906 can add context to incoming production data (e.g., a time/date stamp, a location associated with the data, machine statuses at the time the data was generated, etc.). Cloud-based operator interface system 906 may also aggregate data from multiple industrial systems $912_1$-$912_N$ according to predefined aggregation rules defined by the user. Using these tools in the context of a cloud-based operator interface system, data from geographically diverse industrial systems can be collected, correlated, and aggregated to generate unified enterprise-level presentations of the industrial systems as a whole.

Figure 10:
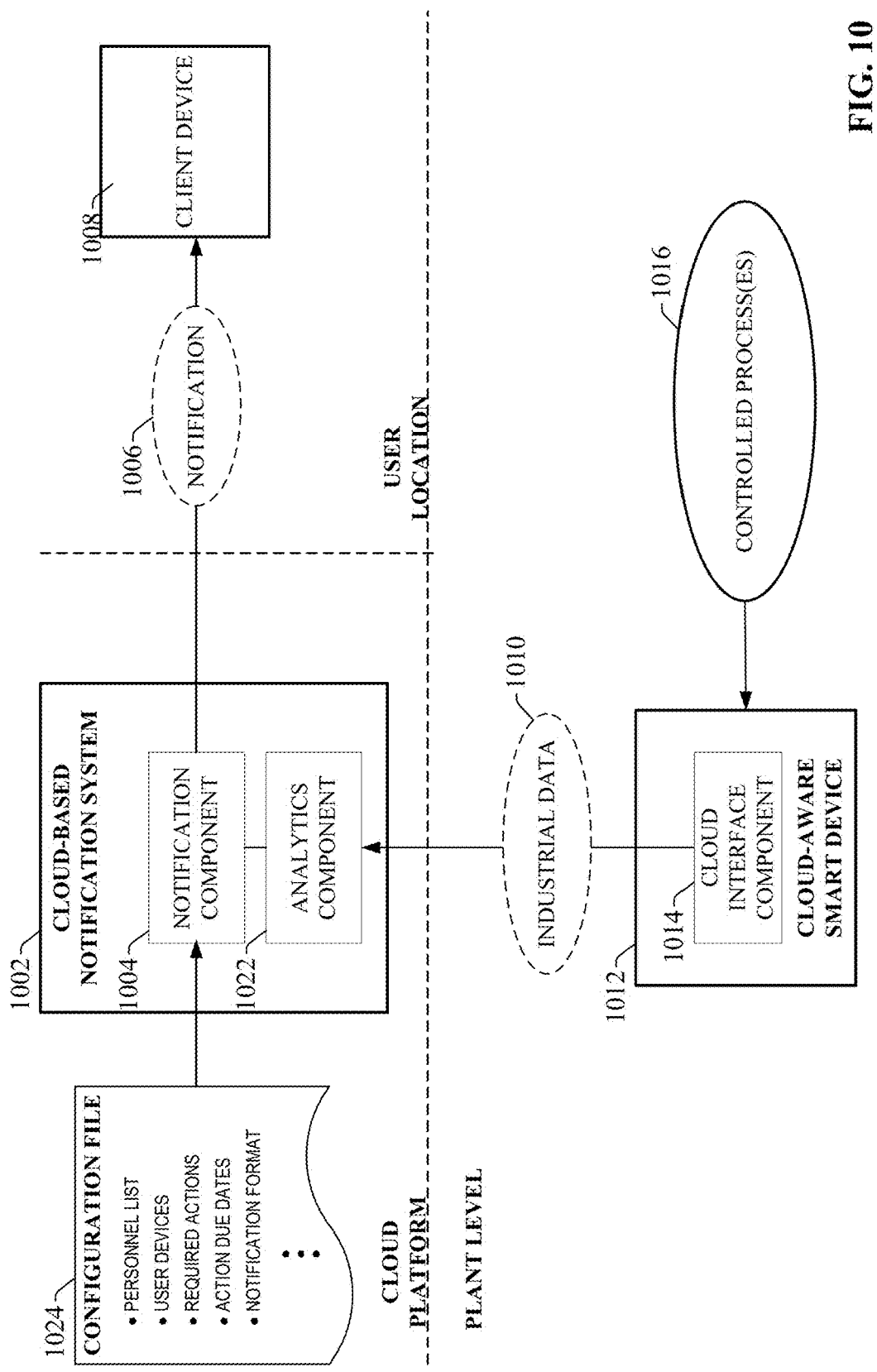
FIG. 10 is a block diagram of an exemplary cloud-based notification system that receives data from a smart device.

In another exemplary application, cloud-aware smart devices can be used in connection with cloud-based notification services for notifying relevant personnel of a detected system event. FIG. 10 illustrates an exemplary notification architecture according to one or more embodiments of this disclosure. In this example, one or more controlled processes 1016 are monitored and/or controlled by cloud-aware smart device 1012, which can be an industrial controller, a sensor, a meter, a motor drive, or other such device. Cloud-aware smart device 1012 collects industrial data from controlled process(es) 1016, or generates process data internally based on monitored conditions of the controlled process(es) 1016. In the present example, cloud-based notification system 1002 residing on the cloud platform is configured to receive industrial data 1010 from cloud-aware smart device 1012 via cloud interface component 1014 and to route notifications 1006 to appropriate plant personnel in accordance with predefined notification criteria.

As described in previous examples, cloud interface component can establish communication with the cloud platform upon installation, and send a device profile to notification system 1002 providing information regarding the device's role, geographical location, location within the plant or enterprise hierarchy, available data, and other such information. Notification system 1002 can use this device profile information to integrate the cloud-aware smart device and configure the device for operation with the cloud-based notification services. For example, notification system 1002 can determine which of the available data items reported in the device profile are to be associated with notification criteria and begin monitoring those data points, using information provided in the device profile to establish communication links to the appropriate data tags in the device. Thereafter, cloud interface component 1014 provides the monitored data to the cloud platform as industrial data 1010.

On the cloud platform, analytics component 1022 can determine whether selected subsets of the industrial data 1010 (or aggregations thereof) meet one or more predefined notification conditions. These can include such conditions as detecting that a particular process value has exceeded a defined setpoint, detecting a transition to a particular machine state, detecting an alarm condition, determining that a specified production goal has been achieved, or other such conditions that can be detected through analysis of the industrial data 1010. When analytics component 1022 detects an actionable condition within the industrial data 1010, analytics component 1022 can inform notification component 1004 that personnel are to be notified. In response, notification component 1004 can identify one or more specific plant employees who are to receive the notification, as well as information identifying a user notification device, phone number, or email address for each person to be notified.

In one or more embodiments, notification component 1004 can determine this notification information by cross-referencing a configuration file 1024 that identifies which personnel are to be notified for a given type of condition, one or more notification methods for each identified person, and/or other relevant information. When analytics component 1022 determines that a subset of the industrial data 1010 requires action to be taken by plant personnel, notification component 1004 can reference the configuration file 1024 to determine, for example, which personnel should be notified, which user devices should receive the notification, a required action to be taken by the recipient, a due date for the action, a format for the notification, and/or other relevant information. Configuration file 1024 can maintain multiple separate personnel lists respectively associated with different types of actionable situations. In some embodiments, the personnel list selected for a given notification can be at least partly a function of the context data provided by the device profile during initial configuration. For example, if industrial data 1010 indicates that a process parameter has exceeded a setpoint value, notification component 1004 can identify the list of personnel to receive the notification based on the area or workcell to which the process parameter relates, wherein the area or workcell is identified based on context data provided by the cloud-aware smart device during initial configuration (e.g., geographical location of the device, location of the device within the plant hierarchy, etc.).

Once notification component 1004 had determined appropriate personnel and devices to be notified, notification component 1004 can deliver notifications 1006 to one or more notification destinations. The notification can be sent to one or more identified Internet-capable client devices 1008, such as a phone, a tablet computer, a desktop computer, or other suitable devices. In some embodiments, a cloud application running on the cloud platform can provide a mechanism for notified personnel to communicate with one another via the cloud (e.g., establish a conference call using Voice-over-IP). In some embodiments, the notification component 1004 can be configured to send the notification 1006 periodically at a defined frequency until the user positively responds to the notification (e.g., by sending a manual acknowledgement via the client devices 1008). Notification component 1004 can also be configured to escalate an urgency of high-priority notifications if an acknowledgment is not received within a predetermined amount of time. This urgency escalation can entail sending the notification 1006 at a gradually increasing frequency, sending the notification to devices associated with secondary personnel if the primary personnel do not respond within a defined time period, or other such escalation measures.

Figure 11:
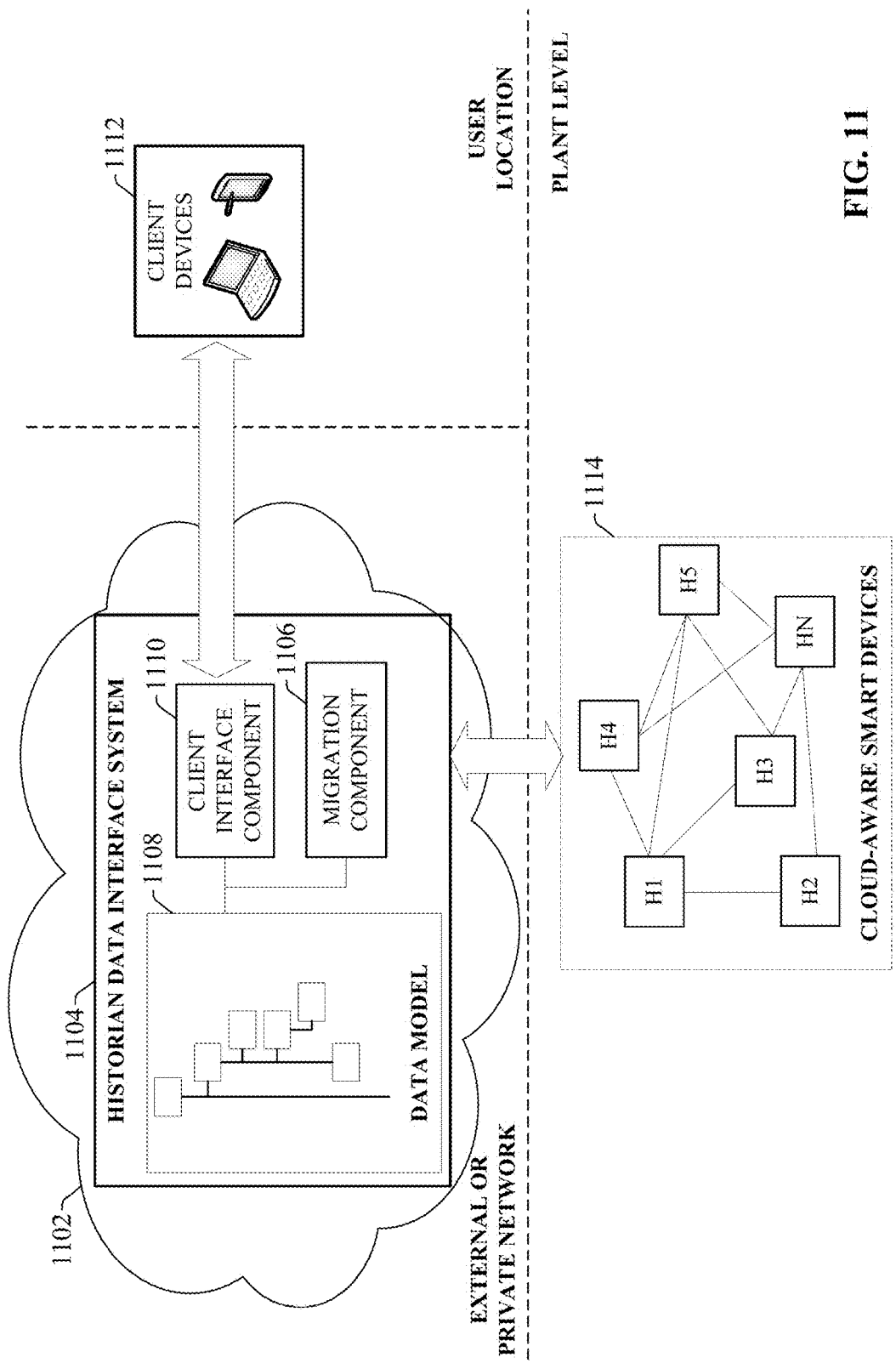
FIG. 11 illustrates an exemplary cloud-based historian system that manages and provisions historian data distributed across multiple smart devices.

Cloud-aware smart devices can also automate management of distributed historian data via a cloud platform. FIG. 11 illustrates an exemplary architecture for a cloud-based historian system that manages and provisions historian data distributed across multiple smart devices. In this example, historian data interface system 1104 resides and executes on cloud platform 1102 as a cloud-based service. In some scenarios, access to cloud platform 1102 and historian data interface system 1104 can be provided to customers as a subscription service. Alternatively, historian data interface system 1104 can be owned and maintained by the end user, and executed on a cloud platform belonging to or provisioned to the user.

Figure 12:
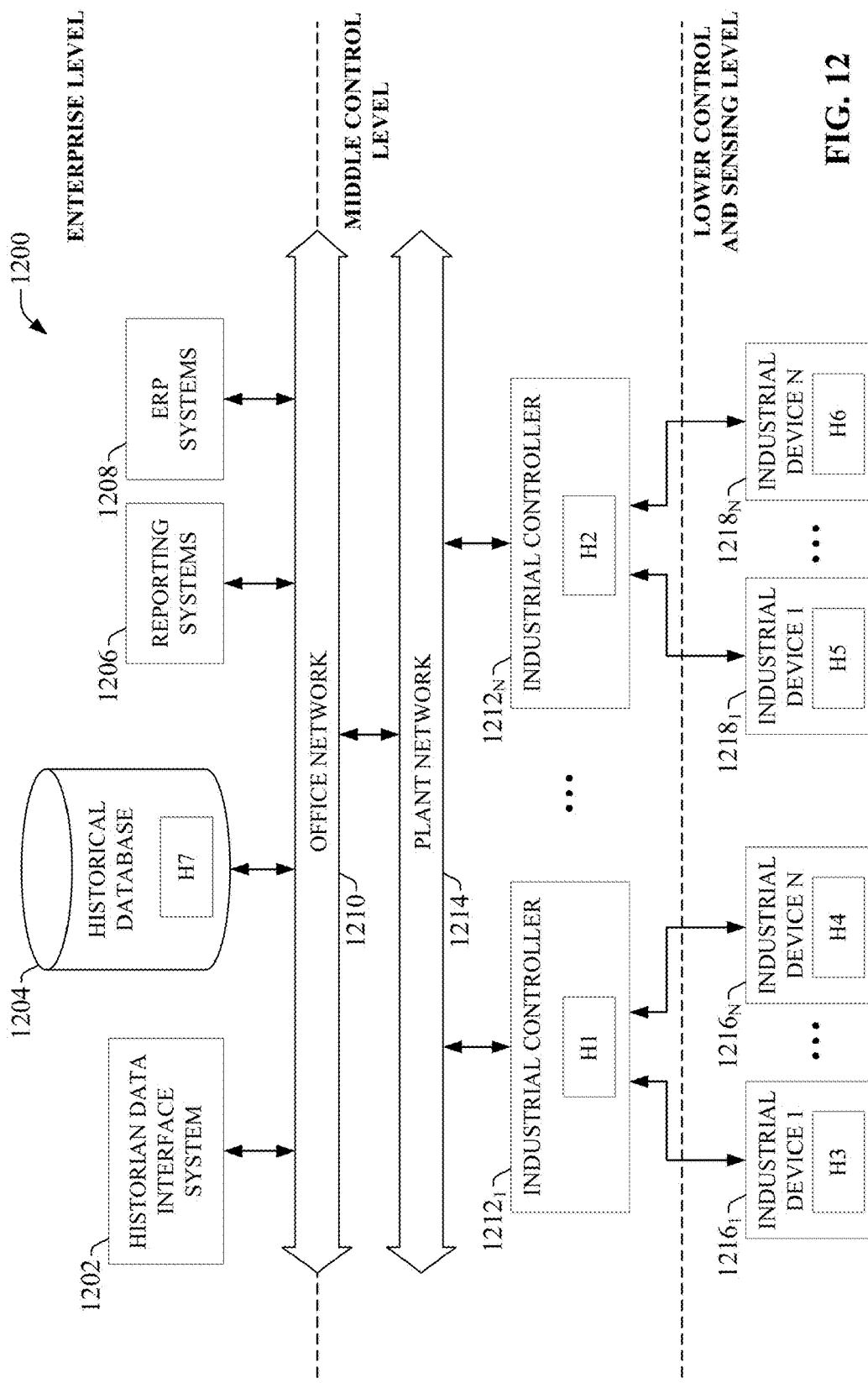
FIG. 12 is a high-level overview of an exemplary industrial enterprise having data storage devices at various hierarchical levels.

In this example, a plurality of cloud-capable smart devices are seen as a historian network 1114 distributed across multiple areas and/or levels of the industrial enterprise. That is, the respective smart devices can have associated therewith respective data historians H1-HN that act as local storage for data generated or monitored by the respective devices. Turning briefly to FIG. 12, a high-level overview of an exemplary industrial enterprise 1200 having data storage devices (e.g., historians) at various hierarchical levels is illustrated. The exemplary industrial enterprise 1200 comprises a lower control and sensing level, a middle control level, and an enterprise level. However, it is to be appreciated that the integrated architecture described herein is suitable for use in any industrial environment comprising any configuration of enterprise levels.

The lower control and sensing level comprises industrial devices $1216_{1-N}$ and $1218_{1-N}$, which are monitored and controlled by industrial controllers $1212_{1-N}$. Industrial devices $1216_{1-N}$ and $1218_{1-N}$ can comprise field devices and systems that provide data to or receive data from the industrial controllers $1212_{1-N}$ in connection with monitor and control of one or more industrial processes carried out on the plant floor. Accordingly, industrial devices $1216_{1-N}$ and $1218_{1-N}$ can include such controller input devices as sensors, telemetry devices, meters, or the like. Industrial devices $1216_{1-N}$ and $1218_{1-N}$ can also include controller output devices, such as actuators, motor drives and contactors, or other such controllable devices. Industrial devices $1216_{1-N}$ and $1218_{1-N}$ may also include low-level control systems, such as vision systems, barcode marking systems, variable frequency drives, industrial robots, and the like which perform local control of portions of the industrial process, or which have their own localized control systems, but which are subservient to the industrial controllers $1212_{1-N}$ on the middle control layer.

Industrial controllers $1212_{1-N}$ can be, for example, programmable logic controllers (PLCs) or other programmable automation controllers (PACs), and facilitate monitor and control of one or more industrial automation systems via the industrial devices $1216_{1-N}$ and $1218_{1-N}$. Exemplary automation systems can include, but are not limited to, batch control systems (e.g., mixing systems), continuous control systems (e.g., PID control systems), or discrete control systems. The controllers exchange data with the industrial devices $1216_{1-N}$ and $1218_{1-N}$ using native hardwired I/O or via a plant network such as Ethernet/IP, Data Highway Plus, ControlNet, Devicenet, or the like. Industrial controllers $1212_{1-N}$ typically receive any combination of digital or analog signals from the industrial devices $1216_{1-N}$ and $1218_{1-N}$ indicating a current state of the devices and their associated processes (e.g., temperature, position, part presence or absence, fluid level, etc.), and execute user-defined control programs that perform automated decision-making for the controlled processes based on the received signals. Industrial controllers $1212_{1-N}$ then output digital and/or analog control signaling to the industrial devices $1216_{1-N}$ and $1218_{1-N}$ in accordance with the decisions made by the control program. These outputs can include device actuation signals, temperature or position control signals, motion control commands, operational commands to a machining or material handling robot, mixer control signals, and the like. The control programs can comprise any suitable type of code used to process input signals read into the industrial controllers $1212_{1\text{-}N}$ and to control output signals generated by the industrial controllers $1212_{1\text{-}N}$, including but not limited to ladder logic, sequential function charts, function block diagrams, structured text, or other such platforms. Any of industrial devices $1216_{1\text{-}N}$ and $1218_{1\text{-}N}$ or industrial controllers $1212_{1\text{-}N}$ can incorporate the cloud capabilities and smart configuration functions described in previous examples to facilitate automated integration and management of the respective devices.

In exemplary industrial enterprise 1200, industrial controllers $1212_{1\text{-}N}$ reside on plant network 1214, which provides networked connectivity between controllers $1212_{1\text{-}N}$. One or more of industrial devices $1216_{1\text{-}N}$ and $1218_{1\text{-}N}$ may also reside on plant network 1214. Plant network 1214 can utilize any suitable networking architecture and protocol, including, but not limited to, Control and Information Protocol (CIP), Ethernet, Ethernet/IP, Data Highway Plus, ControlNet, Devicenet, or the like.

The enterprise level can comprise the business side of the enterprise, and can include such business operations as financial analysis, marketing, sales, order management, long term business planning, resource management, inventory management, and the like. The enterprise level can also include systems that leverage industrial data generated by and received from the two plant-floor levels, such as reporting systems 1206 and Enterprise Resource Planning (ERP) system 1208, which correlate and manage high-level business functions in view of plant floor operations. An office network 1210 can interconnect one or more office systems residing on the enterprise level using a suitable office network protocol (e.g., TCP/IP over Ethernet). For example, office network 1210 can interconnects employee desktop or laptop computers to an office server, printing devices, or other office equipment. Office network 1210 may also be connected to plant network 1214 (e.g., through a router or firewall) to facilitate aggregation of data from the plant floor at the enterprise level.

Devices on the middle control level and the lower control and sensing level can generate large amounts of data relating to control and monitoring of one or more industrial automation systems. Accordingly, any of the industrial controllers $1212_{1\text{-}N}$ and/or the industrial devices $1216_{1\text{-}N}$ and $1218_{1\text{-}N}$ may have associated therewith respective data historians (e.g., historians H1-HN, where N is an integer) that act as local storage for the data generated by the respective devices. Each of historians H1-HN can offer a platform that provides high speed, time series data storage and retrieval from multiple controllers or devices. Historians H1-HN can communicate with industrial controllers $1212_{1\text{-}N}$ and industrial devices $1216_{1\text{-}N}$ and $1218_{1\text{-}N}$ through standard network interfaces or across the controllers' respective backplanes.

Exemplary industrial enterprise 1200 also includes an enterprise-level historical database 1204, which can provide long-term storage of plant floor or business-side data. Historical database 1204 thus serves as an enterprise level data historian (H7). As illustrated in FIG. 12, historians H1-HN are distributed across various levels of the industrial enterprise to facilitate data collection across the organizational hierarchy.

Returning now to FIG. 11, historian data interface system 1104 residing on cloud platform 1102 can provide tools for correlating, viewing, and managing the data stored across the enterprise in historians H1-HN. To this end, historian data interface system 1104 can provide a common interface for distributed historians H1-HN that allows users to access the historian data, facilitates creation of meaningful views of the data, and other historian management features. Historian data interface system 1104 can correlate the respective historians H1-HN residing on the multiple levels of the enterprise such that data stored on any historian can be seamlessly accessed from a common interface or through a common protocol.

If cloud platform 1102 is a web-based cloud, smart devices associated with historians H1-HN of historian network 1114 may interact with historian data interface system 1104 directly or via the Internet. In an exemplary configuration, historians H1-HN may interact with historian data interface system 1104 through cloud interface components of their respective smart devices, either directly or through a cloud gateway or proxy.

Cloud-based historian data interface system 1104 can leverage data model 1108 (similar to data models 606 and 804) in connection with historian configuration, management, viewing, and reporting. As in previous examples, when a new cloud-aware smart device is added at any level of the enterprise, the smart device will communicatively connect to the cloud platform and provide a device profile containing information regarding the device's identity, role within the enterprise, geographic location, local context, available data, etc. Historian data interface system 1104 can then update data model 1108 to include type instances representing the new device at appropriate locations within the enterprise hierarchy (e.g., based on the location and context information in the device profile). Data model 1108 can then be used by historian data interface system to provide a unified view of data stored in distributed historians H1-HN, allowing a user to view and retrieve selected subsets of the historian data.

For example, historian data interface system 1104 can provide a common historian interface to client devices 1112 having Internet capability and suitable access privileges. Accordingly, historian data interface system 1104 includes a client interface component 1110 configured to receive data retrieval requests from client devices 1112, and to render selected subsets of historian data to the client devices 1112 in response to the requests. Through client interface component 1110, historian data interface system 1104 can deliver any preconfigured interface screens to the client devices 1112 and allow the user to remotely request and view historian data stored in historians H1-HN through interaction with these screens. Historian data interface system 1104 can also facilitate remote configuration of historians H1-HN via cloud platform 1102. In some embodiments, client interface component 1110 can present browsable hierarchical view of smart device data tags distributed throughout the enterprise (e.g., controller tags located within industrial controllers $1212_{1\text{-}N}$ of FIG. 12), where the controller tags represent data items being monitored or generated by the respective controllers (e.g., a meter value, a machine state, a production count, etc.). The hierarchical view of the controller tags can accord to data model 1108, which defines the hierarchical levels of the organization, the devices comprising each level, and the hierarchical relationships between the devices.

In another exemplary application, a migration component 1106 can be configured to replicate or migrate selected sets of historian data from historians H1-HN to cloud storage on cloud platform 1102, allowing the data to be quickly retrieved by client devices 1112. Migration component 1106 can also replicate historian data residing on cloud storage back to historians H1-HN if required, providing a mechanism for reliable cloud-based backup storage of historian data. To facilitate access level granularity, cloud storage associated with cloud platform 1102 can be partitioned such that portions of cloud storage can be selectively masked or unmasked to respective parties. With cloud storage partitioned in this manner, migration component 1106 can be configured to migrate or replicate a first subset of historian data to a first partition having full public access settings, and a second subset of historian data to a second partition set as private, where access to historian data on the second partition is granted only to users having suitable access privileges.

In some embodiments, cloud-based historian data interface system 1104 can also be configured to perform cloud-side analytics on historian data stored in historians H1-HN, and generate reports, alarms, or notifications based on results of these analytics. For example, historian data interface system 1104 can operate in conjunction with a cloud based notification system (e.g., notification system 1002) to issue notifications to selected client devices 1112 in response to a determination that a subset of historian data stored in historians H1-HN has met one or more predefined conditions. These conditions can include, for example, detecting that a particular process value has exceeded a defined setpoint, detecting a transition to a particular machine state, detecting an alarm condition, determining that a specified production goal has been achieved, or other such conditions that can be detected through analysis of the historian data.

Historian data interface system 1104 can also leverage data model 1108 in connection with aggregating historian data between historians H1-HN. For example, an administrator may configure the system to aggregate historical data stored on the middle or lower control levels to historians on the enterprise level for long-term archival storage when such data has reached a certain age (e.g., archive plant floor data to an enterprise level storage device when the data has become a week old). Accordingly, migration component 1106 can determine suitable enterprise-level devices for long-term storage of the data by referencing the organizational hierarchy represented by data model 1108, and send instructions to relevant historians on historian network 1114 to aggregate the data from the plant-level devices to the identified enterprise-level device. Thus, dynamic device and historian configuration made possible by the cloud-aware smart devices described herein can simplify and substantially automate many functions associated with collection and management of plant historian data.

Figure 13:
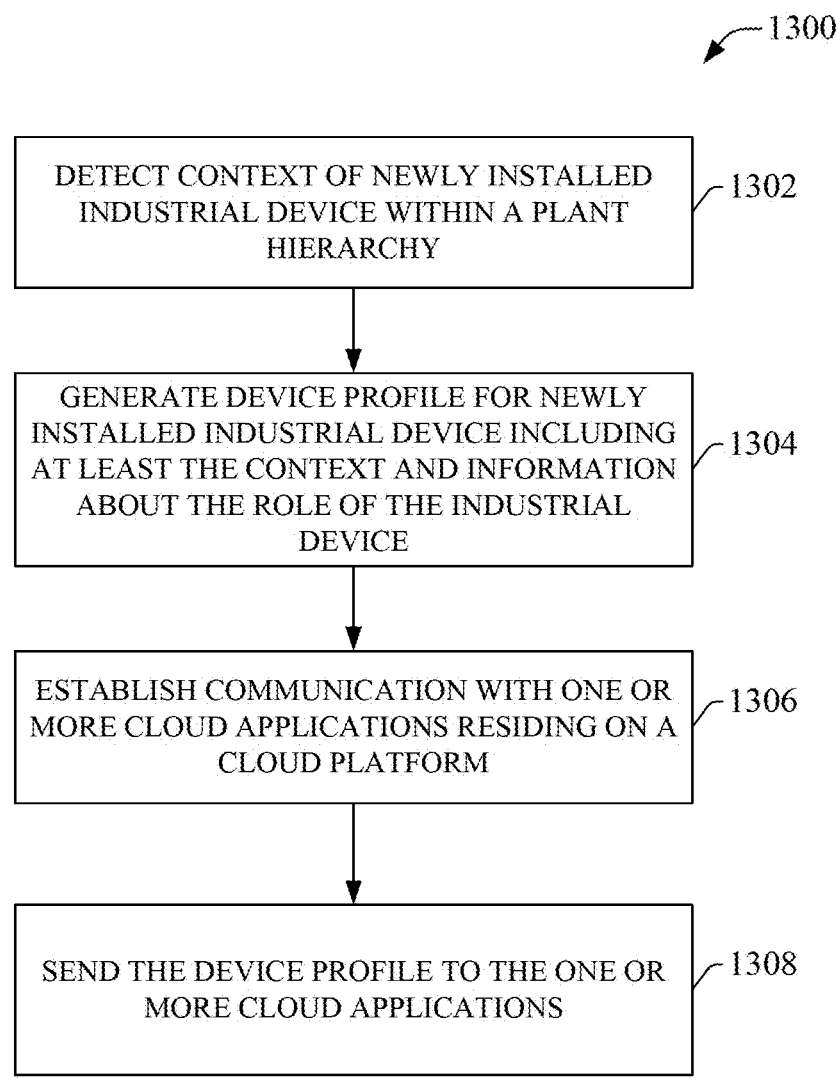
FIG. 13 is a flowchart of an exemplary methodology for configuring a smart industrial device using a cloud platform.
Figure 14:
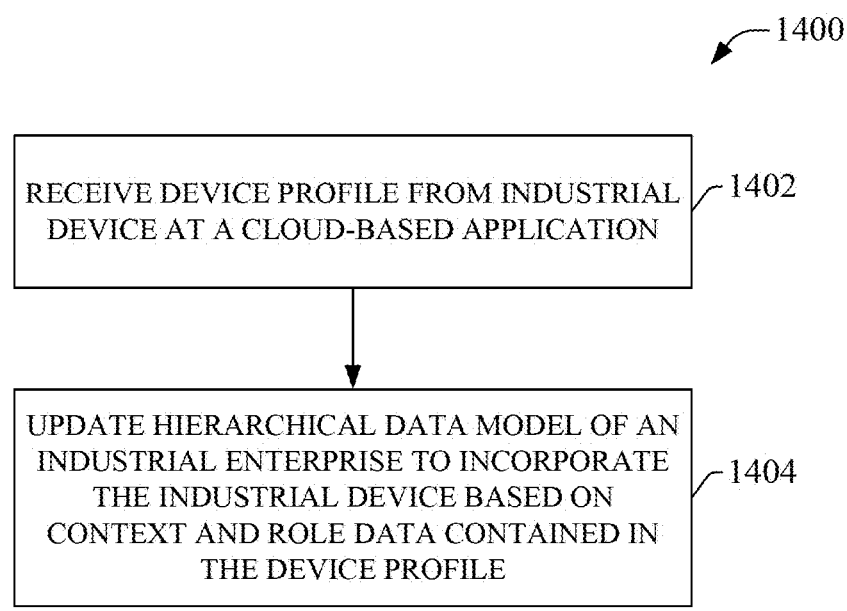
FIG. 14 is a flowchart of an example methodology for integrating a smart industrial device into a hierarchical data model of an industrial enterprise.

FIGS. 13-14 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for configuring a smart industrial device using a cloud platform. Initially, at 1302, a context of a newly installed industrial device within a plant hierarchy is detected. For example, the industrial device can recognize and identify other devices in its proximity and their relationship to the newly installed industrial device, determine a geographical location, or gather other relevant context information. At 1304, a device profile is generated for the newly installed industrial device, wherein the device profile includes at least the context determined at step 1302 and information about the role of the industrial device within an automation system. At 1306, the industrial device establishes communication with one or more cloud applications residing on a cloud platform. In some embodiments, the industrial device can reference a configuration file to determine relevant information for accessing the cloud platform (e.g., a URL of the cloud platform). At 1308, the industrial device sends the device profile to the one or more cloud applications. The device profile can be used by the cloud-based applications to facilitate configuration and integration of the industrial device.

FIG. 14 illustrates an example methodology 1400 for integrating a smart industrial device into a hierarchical data model of an industrial enterprise. Initially, at 1402, a device profile is received from an industrial device at a cloud-based application. The cloud-based application can be, for example, a cloud-based device management system, an operator interface system, a notification system, a historian management system, or other such cloud-based services. The device profile can include data relating to the industrial device that can be leveraged by the cloud-based application to facilitate integration of the device within a larger system context, including but not limited to local context information, role information, location information, etc. At 1404, a hierarchical data model of an industrial enterprise is updated based on context and role data contained within the device profile. Such a data model can provide the cloud-based application with an enterprise-level view of the industrial system, and can be leveraged to facilitate remote configuration of the industrial device, management of historian data distributed across devices of the enterprise, generate hierarchical views of data on the system, or other such functions.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
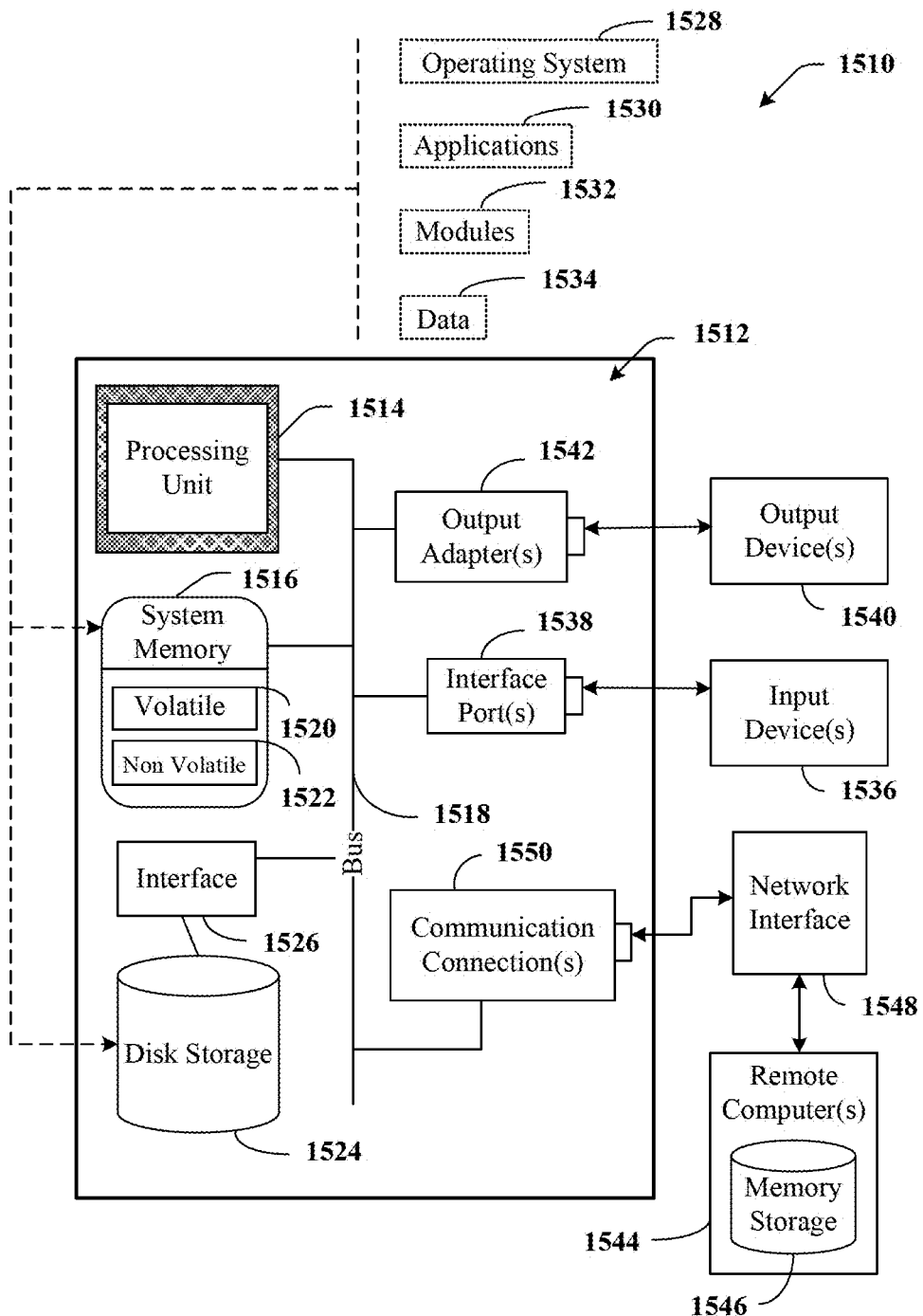
FIG. 15 is an example computing environment.
Figure 16:
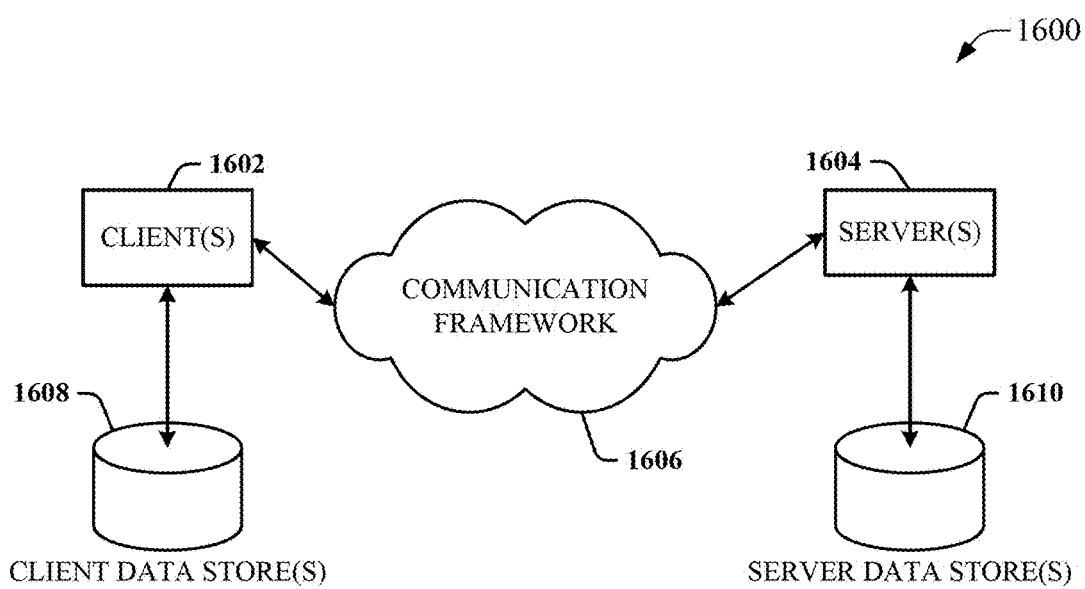
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, an example environment 1510 for implementing various aspects of the aforementioned subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Multi-core microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable PROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer 1512. System applications 1530 take advantage of the management of resources by operating system 1528 through program modules 1532 and program data 1534 stored either in system memory 1516 or on disk storage 1524. It is to be appreciated that one or more embodiments of the subject disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapters 1542 are provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the system bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample computing environment 1600 with which the disclosed subject matter can interact. The sample computing environment 1600 includes one or more client(s) 1602. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. An industrial automation device, comprising:
   a processor; and
   a memory communicatively coupled to the processor, the memory having stored therein computer-executable components comprising:
   a role component configured to determine an industrial automation role of the industrial automation device in a particular industrial automation process based on a type of the industrial automation device and a hierarchical position of the industrial automation device in a hierarchical model describing the industrial automation environment;
   a profile generation component configured to generate a device profile for the industrial automation device that includes at least the industrial automation role and context information of the industrial automation device; and
   a cloud interface component that communicatively connects the industrial automation device to a cloud platform and sends the device profile to the cloud platform.

2. The industrial automation device of claim 1, further comprising a plant context component configured to analyze the industrial automation environment in which the industrial automation device resides and determine the context information relating to the industrial automation device in the industrial automation environment based on the analysis.

3. The industrial automation device of claim 2, wherein the plant context component is further configured to determine the context information comprising an industrial manufacturing process performed by at least one of the devices on a network common to the industrial automation device; and the role component is further configured to determine the industrial automation role of the industrial automation device based upon the industrial manufacturing process performed by the at least one of the devices on the network common to the industrial automation device.

4. The industrial automation device of claim 2, wherein the plant context component is further configured to determine the context information comprising the hierarchical position of the industrial automation device in the hierarchical model.

5. The industrial automation device of claim 4, wherein the plant context component is further configured to determine the hierarchical position of the industrial automation device in the hierarchical model by analysis of a topology of devices on a network common to the industrial automation device.

6. The industrial automation device of claim 4, wherein the plant context component is further configured to determine the context information comprising a change of the hierarchical position of the industrial automation device in the hierarchical model describing the industrial automation environment.

7. The industrial automation device of claim 4, wherein the hierarchical model describes a hierarchical organization of at least one of devices, areas, or facilities in the industrial automation environment.

8. The industrial automation device of claim 1, wherein the profile generation component is further configured to identify data required by the industrial automation device based on the industrial automation role of the industrial automation device and include an indication of the required data in the device profile.

9. A method, comprising:
   determining, by an industrial automation device including a processor, context information relating to the industrial automation device in an industrial automation environment by evaluating the industrial automation environment in which the industrial automation device resides;
   determining, by the industrial automation device, an industrial automation role of the industrial automation device in a particular industrial automation process within the industrial automation environment based on a type of the industrial automation device and a hierarchical position of the industrial automation device in a hierarchical model describing the industrial automation environment; and
   sending, by the industrial automation device to a cloud platform, a device profile comprising information describing the industrial automation role and the context information.

10. The method of claim 9, wherein the determining the context information comprises determining an industrial manufacturing process performed by at least one of the devices on a network common to the industrial automation device; and the determining the industrial automation role of the industrial automation device is further based upon the industrial manufacturing process performed by the at least one of the devices on the network common to the industrial automation device.

11. The method of claim 9, wherein the determining the context information comprises determining the hierarchical position of the industrial automation device in the hierarchical model describing the industrial automation environment.

12. The method of claim 11, wherein the determining the hierarchical position of the industrial automation device in the hierarchical model is based on an analysis of a topology of devices on a network common to the industrial automation device.

13. The method of claim 11, wherein the determining the context information comprises determining a change of the hierarchical position of the industrial automation device in the hierarchical model describing the industrial automation environment.

14. The method of claim 9, further comprising:
   identifying, by the industrial automation device, data required by the industrial automation device based on the industrial automation role of the industrial automation device; and
   including, by the industrial automation device within the device profile, an indication of the data required by the industrial automation device.

15. A non-transitory computer-readable medium having stored thereon computer-executable instructions that, in response to execution, cause an industrial automation device including a processor to perform operations comprising:
   determining context information relating to the industrial automation device in an industrial automation environment by evaluating the industrial automation environment in which the industrial automation device resides;
   determining an industrial automation role of the industrial automation device in a particular industrial automation process within the industrial automation environment based on a type of the industrial automation device and a hierarchical position of the industrial automation device in a hierarchical model describing the industrial automation environment; and
   sending, to a cloud platform, a device profile comprising information describing the industrial automation role and the context information.

16. The non-transitory computer-readable medium of claim 15, wherein the determining the context information comprises determining an industrial manufacturing process performed by at least one of the devices on a network common to the industrial automation device; and the determining the industrial automation role of the industrial automation device is further based upon the industrial manufacturing process performed by the at least one of the devices on the network common to the industrial automation device.

17. The non-transitory computer-readable medium of claim 16, wherein the determining the context information comprises determining the hierarchical position of the industrial automation device in the hierarchical model describing the industrial automation environment.

18. The non-transitory computer-readable medium of claim 17, wherein the determining the hierarchical position of the industrial automation device in the hierarchical model is based on an analysis of a topology of devices on a network common to the industrial automation device.

19. The non-transitory computer-readable medium of claim 17, wherein the determining the context information comprises determining a change of the hierarchical position of the industrial automation device in the hierarchical model describing the industrial automation environment.

20. The non-transitory computer-readable medium of claim 15, further comprising:
   identifying data required by the industrial automation device based on the industrial automation role of the industrial automation device; and
   including within the device profile an indication of the data required by the industrial automation device.

* * * * *